(12) United States Patent
Lembersky et al.

(10) Patent No.: US 9,787,838 B1
(45) Date of Patent: Oct. 10, 2017

(54) SYSTEM AND METHOD FOR ANALYSIS OF INTERACTIONS WITH A CUSTOMER SERVICE CENTER

(71) Applicant: NICE-SYSTEMS LTD, Ra'anana (IL)

(72) Inventors: Gennadi Lembersky, Haifa (IL); Hila Kneller, Zufim (IL); Jeffrey Stern, Tel Aviv (IL)

(73) Assignee: NICE-SYSTEMS LTD, Ra'anana (IL)

( * ) Notice: Subject to any disclaimer, the term of this patent is extended or adjusted under 35 U.S.C. 154(b) by 0 days.

(21) Appl. No.: 15/279,472

(22) Filed: Sep. 29, 2016

(51) Int. Cl.
| | |
|---|---|
| *H04M 3/00* | (2006.01) |
| *H04M 5/00* | (2006.01) |
| *H04M 3/42* | (2006.01) |
| *H04M 3/51* | (2006.01) |
| *G06F 17/27* | (2006.01) |
| *G06F 3/0481* | (2013.01) |

(52) U.S. Cl.
CPC ........ *H04M 3/5175* (2013.01); *G06F 3/0481* (2013.01); *G06F 17/2765* (2013.01); *G06F 17/2785* (2013.01); *G06F 17/2795* (2013.01); *H04M 3/5191* (2013.01)

(58) Field of Classification Search
CPC ...... H04M 3/51; H04M 3/523; H04M 3/5232; H04M 3/5183

USPC ........... 379/265.07, 265.11, 265.13, 265.05, 379/265.01, 266.01, 266.02, 201.04, 379/201.05, 201.01
See application file for complete search history.

(56) References Cited

U.S. PATENT DOCUMENTS

| | | | | |
|---|---|---|---|---|
| 2007/0198323 | A1* | 8/2007 | Bourne | G06Q 10/00 705/7.41 |
| 2015/0100528 | A1* | 4/2015 | Danson | G06N 5/04 706/21 |

* cited by examiner

*Primary Examiner* — Thjuan K Addy
(74) *Attorney, Agent, or Firm* — Soroker Agmon Nordman

(57) ABSTRACT

A system and method for analysis of interactions with a customer service center, comprising receiving a plurality of customer service interactions, receiving a word cloud computed for the plurality of customer service interactions, consolidating similar or synonymous words into word sets, constructing a weighted graph of the word sets, generating a query for the interaction topic based on a corresponding subset of word sets, selecting at least one representative interaction from the retrieved customer service interactions, and displaying at least a portion of the representative interaction for the selected identified topic.

25 Claims, 13 Drawing Sheets

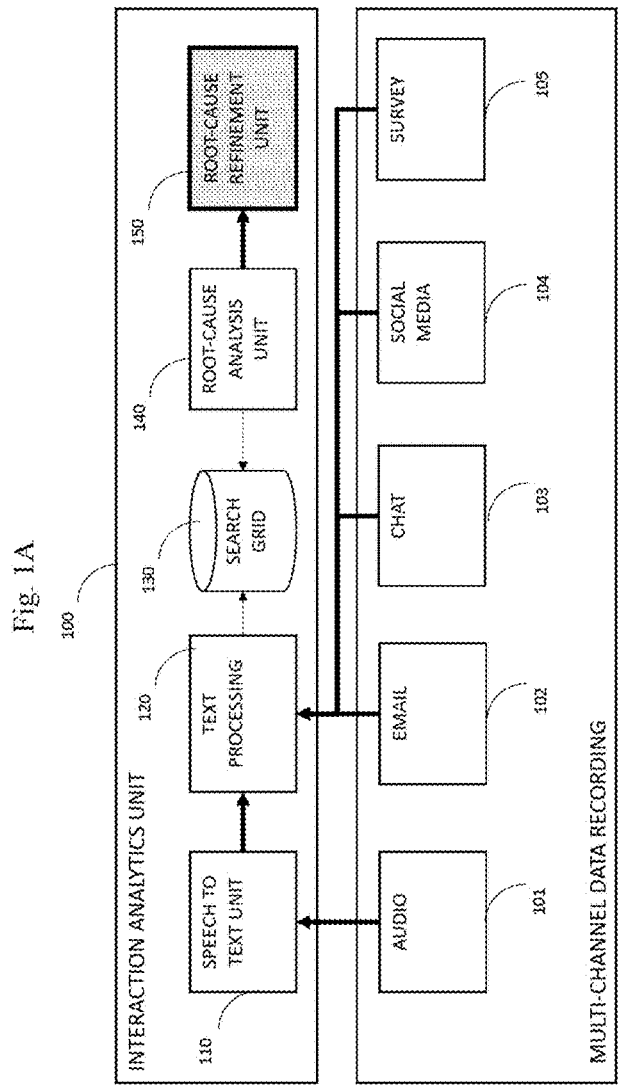

Fig. 2- continuation
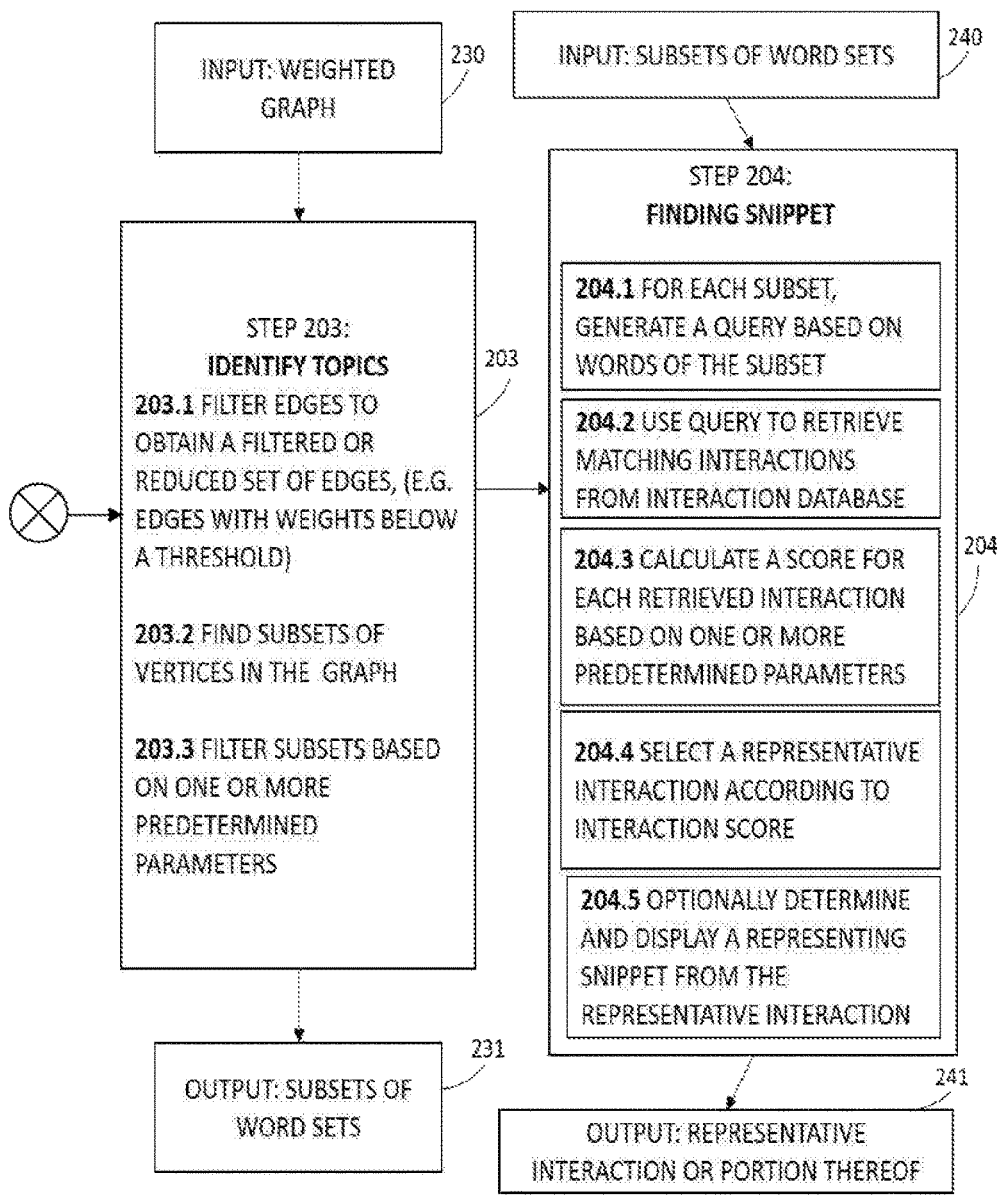

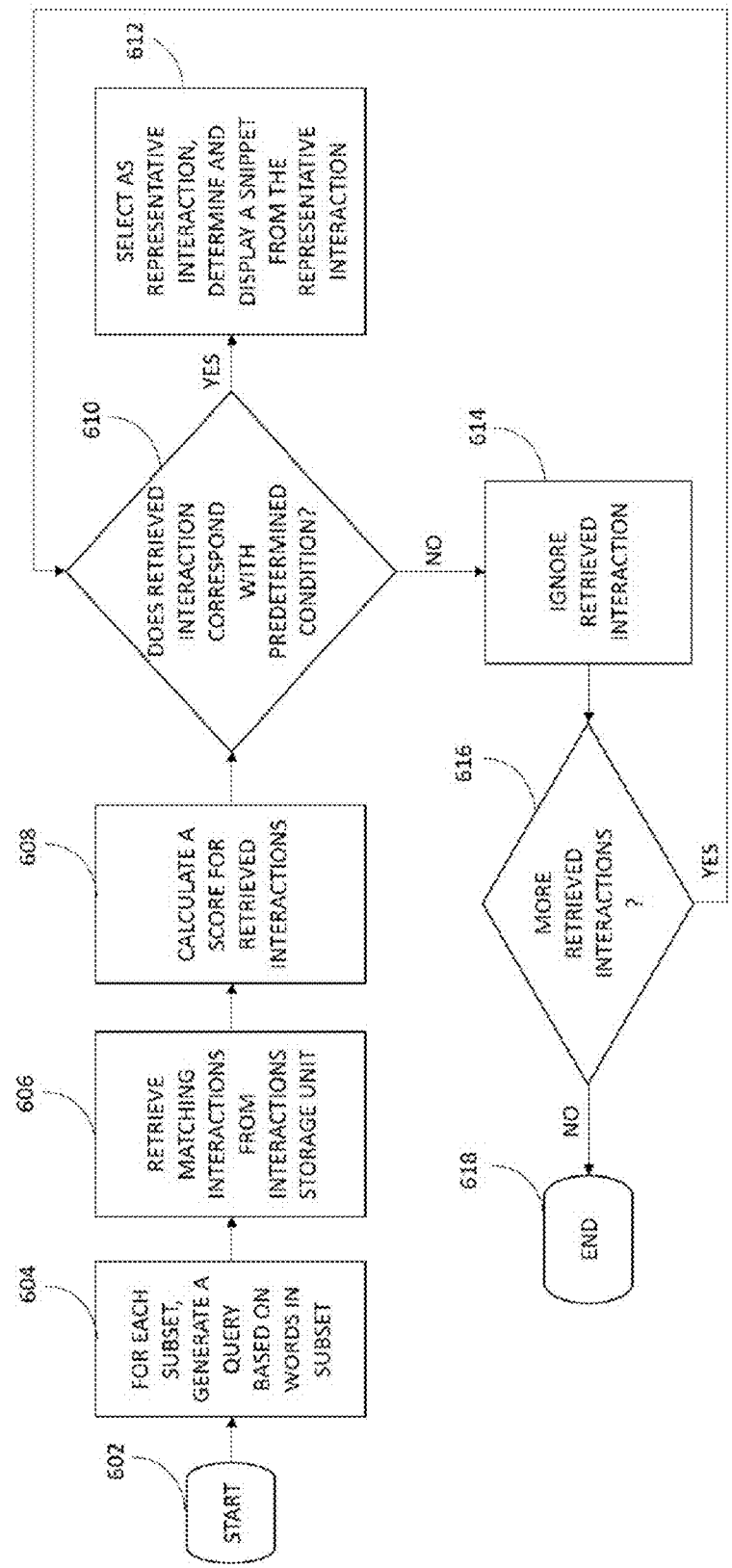

Fig. 9B

INVESTIGATION REPORT, PART 2

Call Change: Increase 35,303 Time Period: Last 7 days Call Type: DSAT (Dissatisfaction)

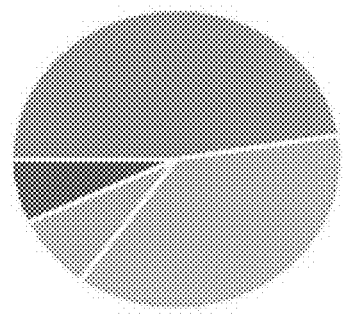

Breakdown

■ 1 ■ 2 ■ 3 ■ Other

| 2 | Call Change: Increase 3,133 Time Period: Last 7 days Call Type: DSAT, Customer Support, Billing, Late fee |

Reason: 3 major call examples identified

 ".. email with invoice went to my Spam folder so I was unaware of the bill.."

 ".. For some reason the email you sent about my bill never got to my inbox, I only noticed today it went to my spam mail.."

 ".. I never received this past months billing information, please resend it and remove the late fee I understand is attached .."

SYSTEM AND METHOD FOR ANALYSIS OF INTERACTIONS WITH A CUSTOMER SERVICE CENTER

FIELD OF THE INVENTION

The present disclosure generally relates to interactions with a customer service center, and more specifically to analysis of interactions with a customer service center.

BACKGROUND

Call centers or customer service centers are typically configured to receive calls from customers, and provide technical or other assistance in solving various problems that the customers might have encountered. In some cases, calls or interactions received from the customers by the customer service center, may be recorded and analyzed in order to determine whether any issues exist that may be reoccurring among a majority of customers or even more than one customer. If such reoccurring issues exist, these issues need to be addressed quickly and efficiently in order to avoid additional customers or users becoming dissatisfied with the product or service for which the call center was established to provide service for.

Currently, only well-trained analysts are qualified to and capable of using analytical tools in order to understand what is happening in the customer service center, and thus to determine the problematic events or issues that may be the root-cause for customer interactions (e.g. via calls) with the customer service center. Visualization of problematic issues is typically represented in a cumbersome and not clear enough manner, for example using word clouds. Visualization of problematic issues via word clouds is merely an initial step of a full issue analysis, since it requires the well-trained analysts to view, listen to or read many interactions, and to spend significant time on identifying the underlying reason(s) as to why customers are contacting the customer service center, and on converting the word cloud into a set of workable actions. Furthermore, since only experienced analysts are capable of recognizing root-cause issues, and since it takes a while even for such skilled analysts to define and determine the problematic issues, it may take a significant amount of time until such issues are actually resolved.

Therefore, there is a need for an improved automatic analysis and visualization of problematic issues, which may be the root-cause for the reason(s) that customers contact or interact with the customer service center, in a manner that would be coherent to any call center employee, in order to reduce the time of analysis, and to provide a solution to such issues.

SUMMARY

One exemplary embodiment of the disclosed subject matter is a computerized method for analysis of interactions with a customer service center, the method comprising:

receiving a plurality of customer service interactions, the customer service interactions including data obtained from a communication of a customer with the customer service center;

receiving a word cloud computed for the plurality of customer service interactions, the word cloud comprising a plurality of words selected from the customer service interactions;

consolidating similar or synonymous words into word sets;

for a pair of the word sets, calculating a proximity score, said proximity score corresponding to a degree of affinity between the word sets of the pair;

constructing a complete weighted undirected graph of the word sets based on the calculated proximity scores, for example by designating the word sets as vertices of the weighted graph and designating the proximity scores as edge weights;

identifying a subset of word sets in the graph, the subset of word sets corresponding to an interaction topic;

generating a query for the interaction topic based on the corresponding subset of word sets;

retrieving, from an interactions storage unit, customer service interactions that match the generated query;

selecting at least one representative interaction from the retrieved customer service interactions, based on one or more predetermined parameters; and displaying at least a portion of the representative interaction for the selected identified topic, wherein the method is performed using a processor.

According to some embodiments, the method may further comprise the steps of: selecting a representative snippet from the representative interaction; and displaying the representative snippet for the selected identified topic, said snippet representing a root cause identified for at least a portion of the plurality of customer service interactions.

In some embodiments, communication of a customer with the customer service center is selected from a group comprising: audio interaction, email, messaging, instant messaging, chat, web forms, social media, or survey.

According to some embodiments, the method may further comprise the step of selecting a reduced set of edges from the graph according to a predetermined rule or condition, e.g. based on a comparison of weight of edges in the graph with a weight threshold. According to some embodiments, the method may comprise the step of removing edges from the graph if the edge weight is below the weight threshold.

In some embodiments, identifying a subset of word sets in the graph comprises identifying a clique in the graph. In some embodiments, the method may comprise identifying a plurality of cliques in the graph, and filtering cliques that satisfy a predetermined condition. In some embodiments, the method may comprise calculating size and average weight of each clique. According to some embodiments, the method may further comprise comparing calculated size and weight value of each clique to corresponding thresholds. In some embodiments, the method may comprise filtering cliques that their calculated size and weight values do not match the corresponding thresholds or range. For example, the method may comprise filtering cliques that their calculated size and weight values are above or below the corresponding size and weight values thresholds, or within a predetermined range.

According to some embodiments, generating a query comprises including at least one word from each word set per the subset of word sets.

In some embodiments, the method further comprises calculating a score for retrieved interactions based on one or more predetermined parameters, and selecting a representative interaction based on the calculated score.

In some embodiments, selecting a representative snippet from the representative interaction comprises finding a snippet that comprises at least one word of each word set of the query. The snippet may be at least one sentence or phrase selected from the interaction. The snippet may comprise substantially all words of the query, while these words may be located between a word assigned as the first word in the representative interaction, which is any word of the query that appears first in the representative interaction, and a word assigned as the last word in the representative interaction, which is any word of the query that appears last in the representative interaction. In some embodiments, the snippet may include two to three words prior to the word assigned as the first word of the representative interaction, and including two to three words after the word assigned as the last word of the representative interaction. In some embodiments, selecting one or more identified topics comprises calculating size and weight values (e.g., average weight) of each identified topic, and filtering identified topics that are above or below corresponding size and weight values thresholds or within a predetermined range.

In some embodiments, displaying comprises providing a user interface configured to display a list of snippets representing one or different root causes, wherein the list of snippets is displayed in an order according to a determined volume of each root cause. In some embodiments, the order of display of the list of snippets is at a descending or an ascending order of the volume of each root cause, each root cause represented by a corresponding snippet. According to some embodiments, the volume of each root cause is determined by the number of interactions retrieved by its corresponding query.

Another exemplary embodiment of the disclosed subject matter is a computerized system for analysis of interactions with a customer service center, the system comprising:

a customer service center system comprising a user interface configured to accept record, and store customer service interactions with users, the customer service interactions including data obtained from a communication of a customer with the customer service center;

a storage unit configured to store a word cloud generated by a processor, based on words or phrases selected from the interactions;

a customer service interaction analysis unit configured to:
receive the word cloud from the word cloud storage unit,
consolidate similar or synonymous words into word sets,
for a pair of the word sets, calculate a proximity score, said proximity score corresponding to a degree of affinity between the word sets of the pair;
construct a complete weighted undirected graph of the word sets based on the calculated proximity scores, for example by designating the word sets as vertices of the weighted graph and designating the proximity scores as edge weights
identify one or more subset of word sets in the graph, each subset of word sets corresponding to an interaction topic,
generate a query for an interaction topic based on the corresponding subset of word sets,
retrieve customer service interactions that match the generated query,
select a representative interaction from the retrieved customer service interactions, based on one or more predetermined parameters, and
display, via the user interface, at least a portion of the representative interaction for the selected identified topic.

In some embodiments, the customer service interaction analysis unit is further configured to: select a representative snippet from the representative interaction, and display, via the user interface, the representative snippet for the selected identified topic, said snippet representing a root cause identified for at least a portion of the plurality of customer service interactions.

In some embodiments, the communication of a customer with the customer service center is selected from a group comprising: audio interaction, email, messaging, chat, web form, social media, or survey.

According to some embodiments, the customer service interaction analysis unit is further configured to select a reduced set of edges from the graph based on a comparison of weight of edges in the graph with a weight threshold, thereby removing edges from the graph if the edge weight is below the weight threshold.

In some embodiments, the customer service interaction analysis unit is further configured to select the representative snippet from the representative interaction by finding a snippet that comprises at least one word of each word set of the query. The snippet may comprise substantially all words of the query, while these words may be located between a word assigned as the first word in the representative interaction, which is any word of the query that appears first in the representative interaction, and a word assigned as the last word in the representative interaction, which is any word of the query that appears last in the representative interaction. In some embodiments, the snippet may include two to three words prior to the word assigned as the first word of the representative interaction, and including two to three words after the word assigned as the last word of the representative interaction. Such a snippet may represent the root-cause of a problem or an issue in the most concise manner.

In some embodiments, the user interface is configured to display a list of snippets representing one or different root causes, wherein the list of snippets is displayed in an order according to a determined volume of each root cause. In some embodiments, the order of display of the list of snippets is at a descending or an ascending order of the volume of each root cause, each root cause represented by a corresponding snippet. In some embodiments, the volume of each root cause is determined by the number of interactions retrieved by its corresponding query

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1B:
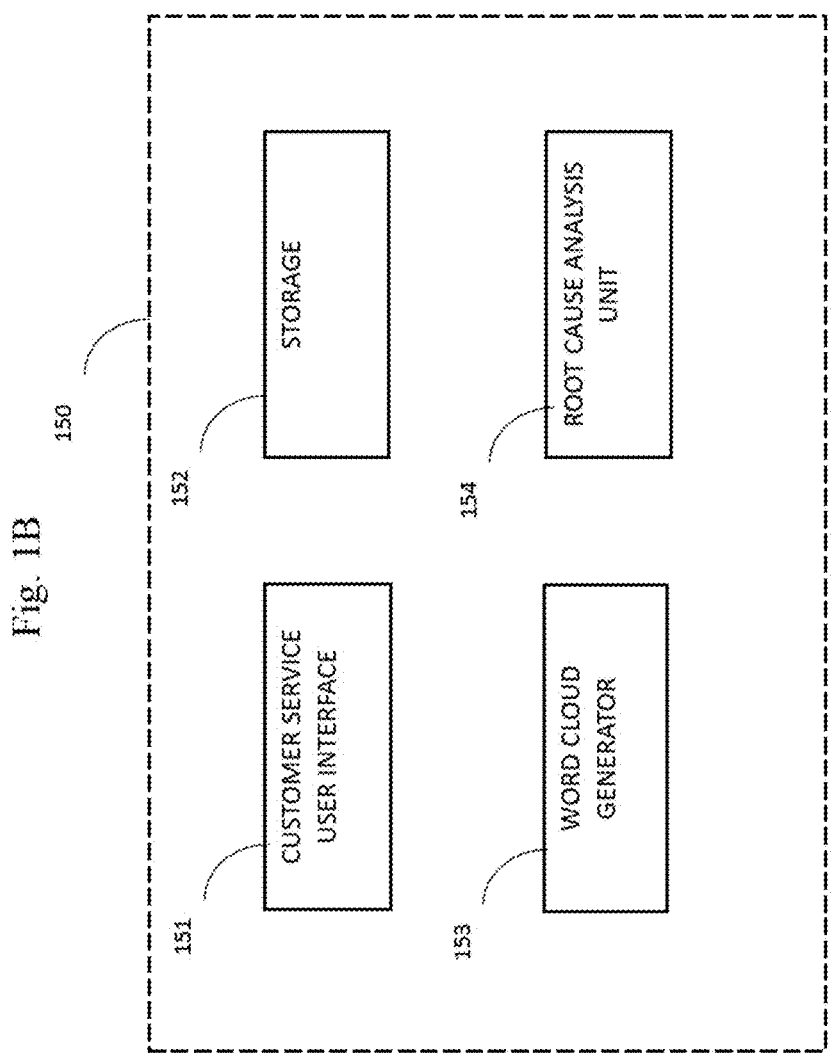

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
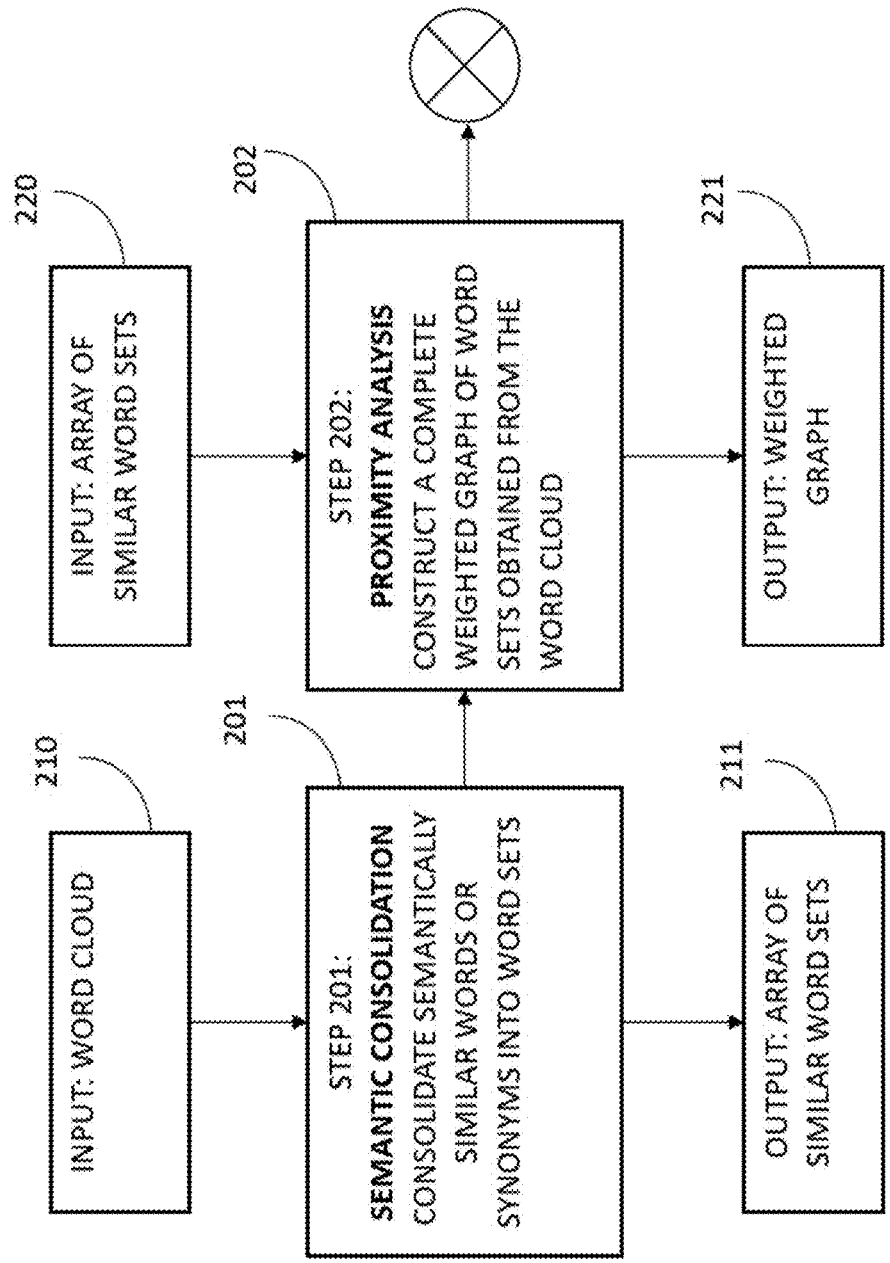
Figure 3:
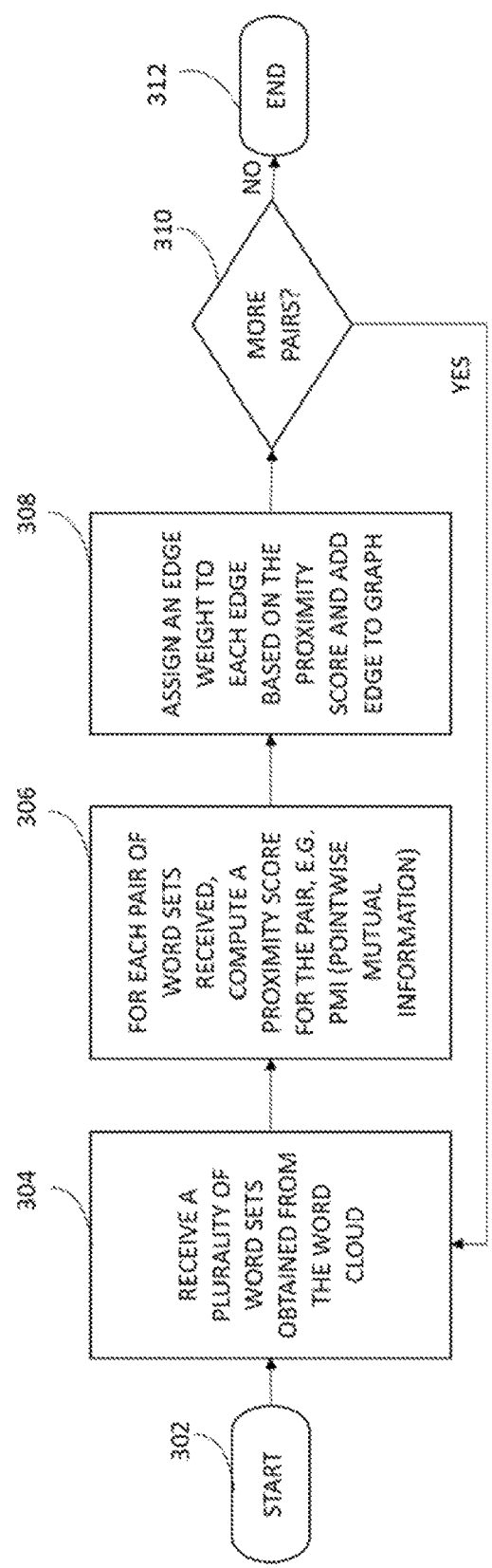
Figure 4:
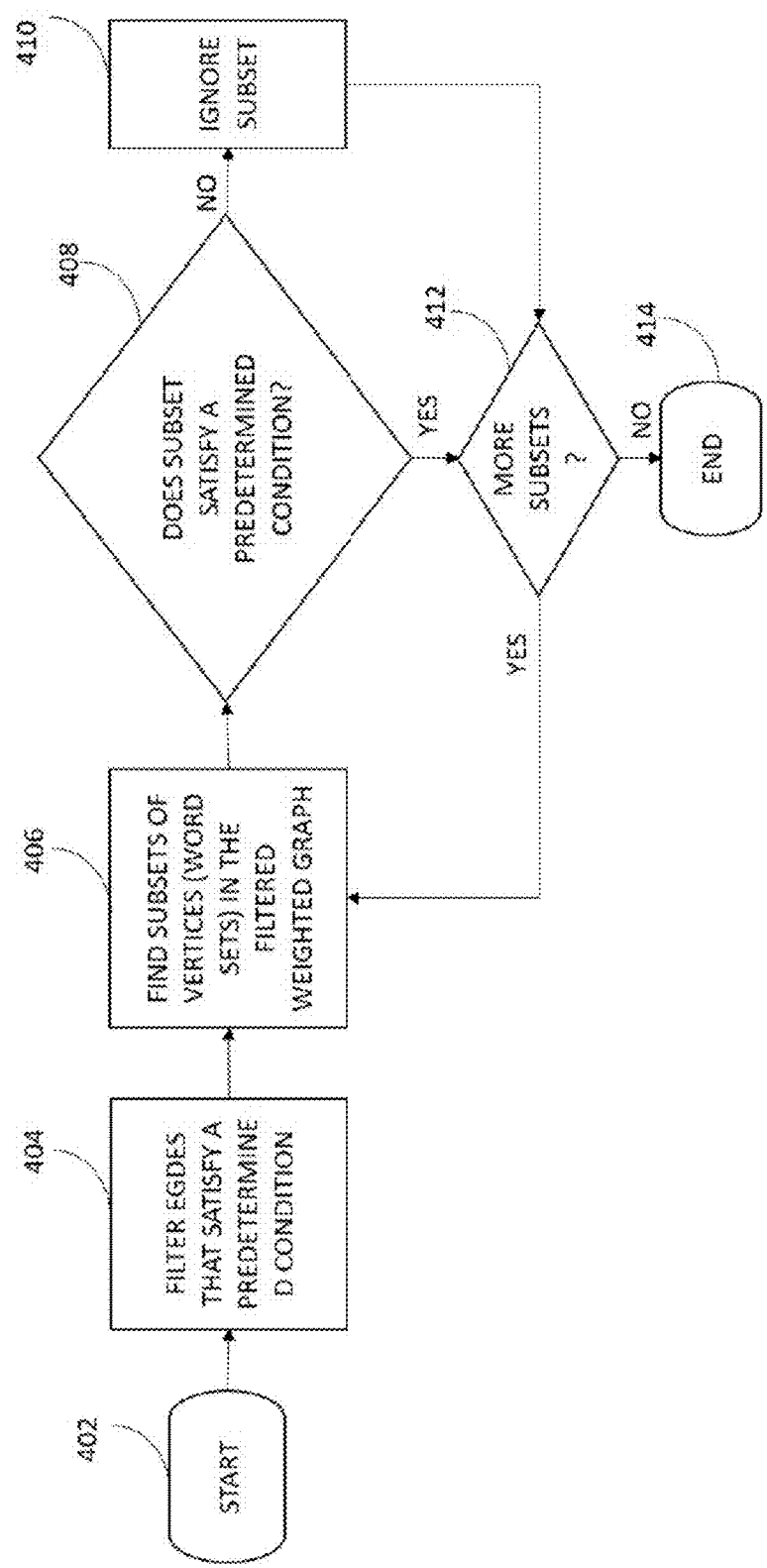
Figure 5:
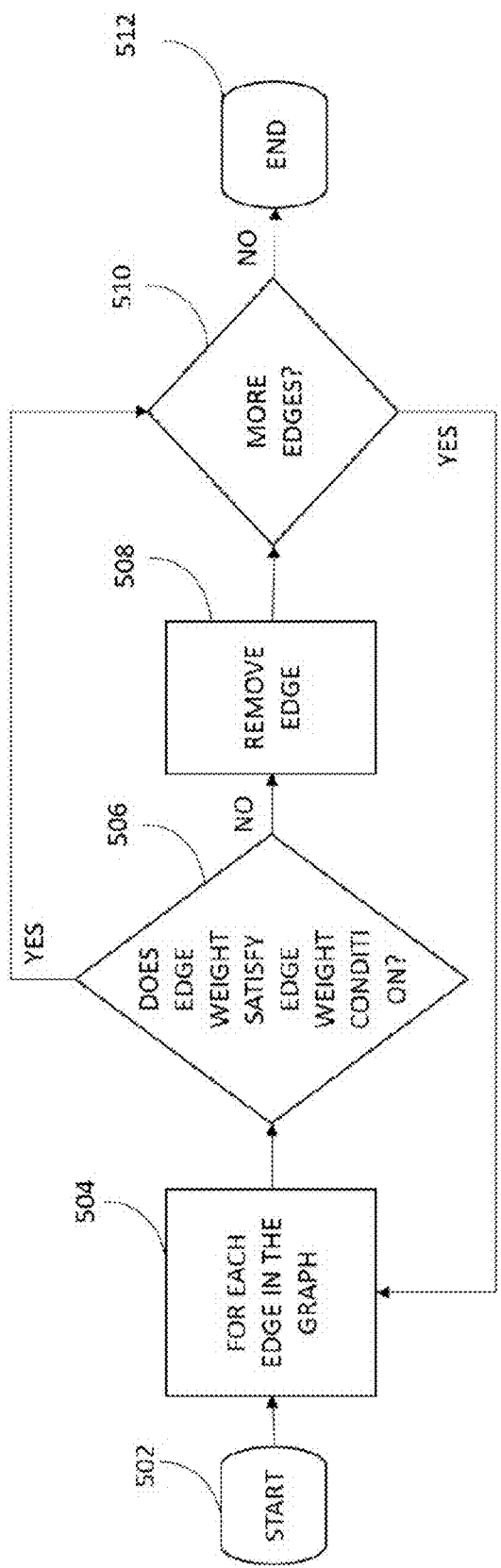
Figure 7A:
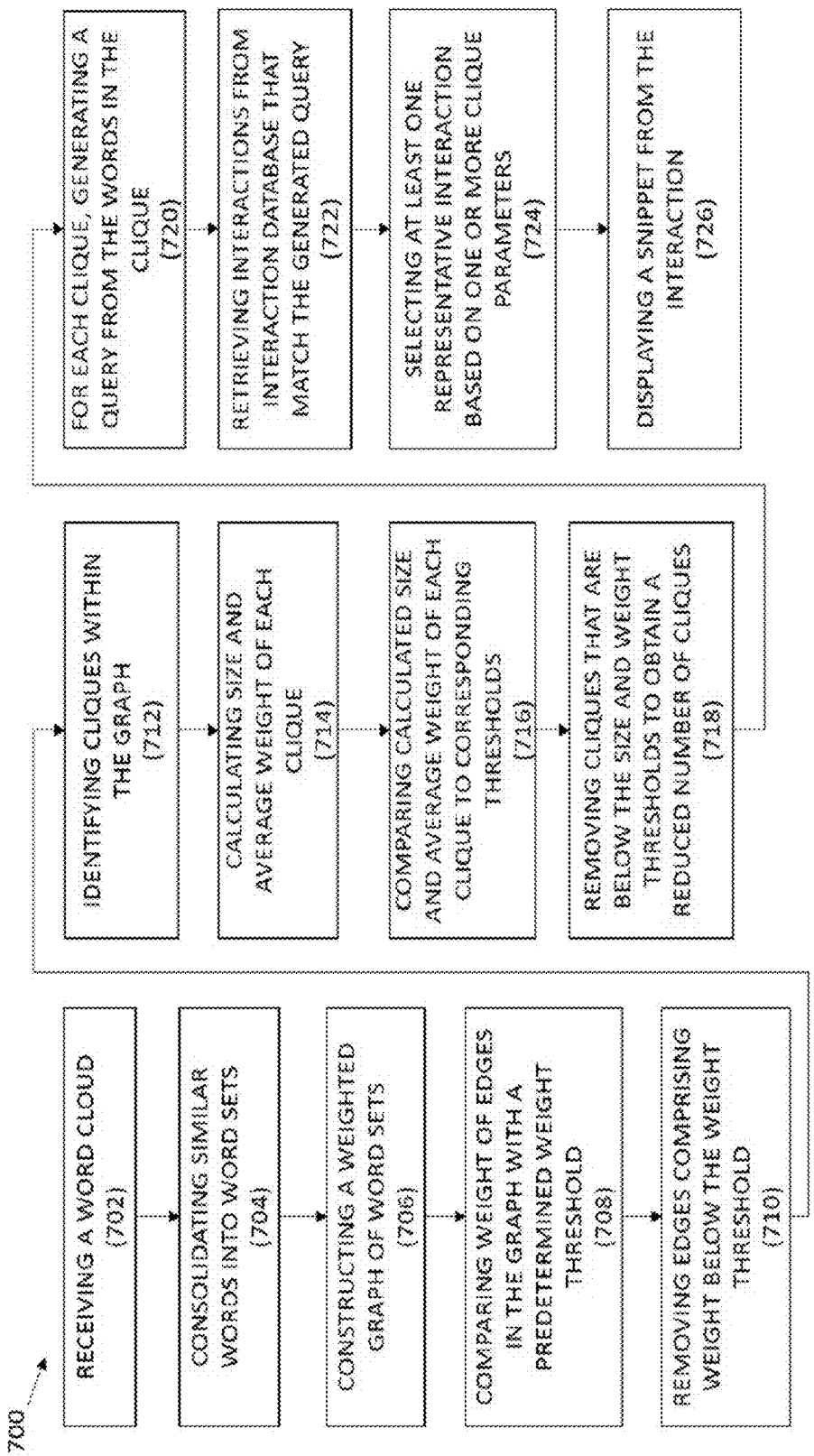
Figure 7B:
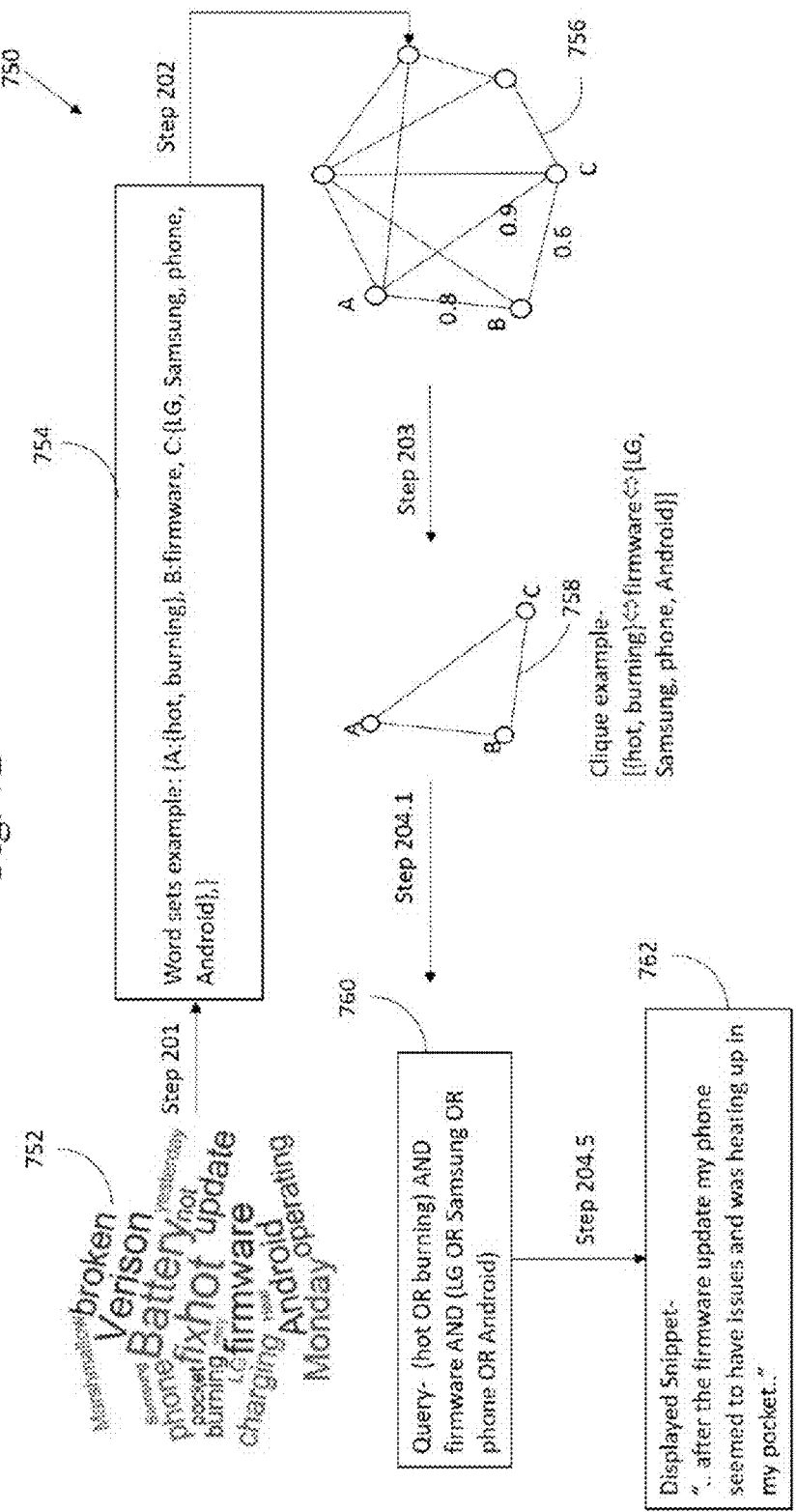
Figure 8:
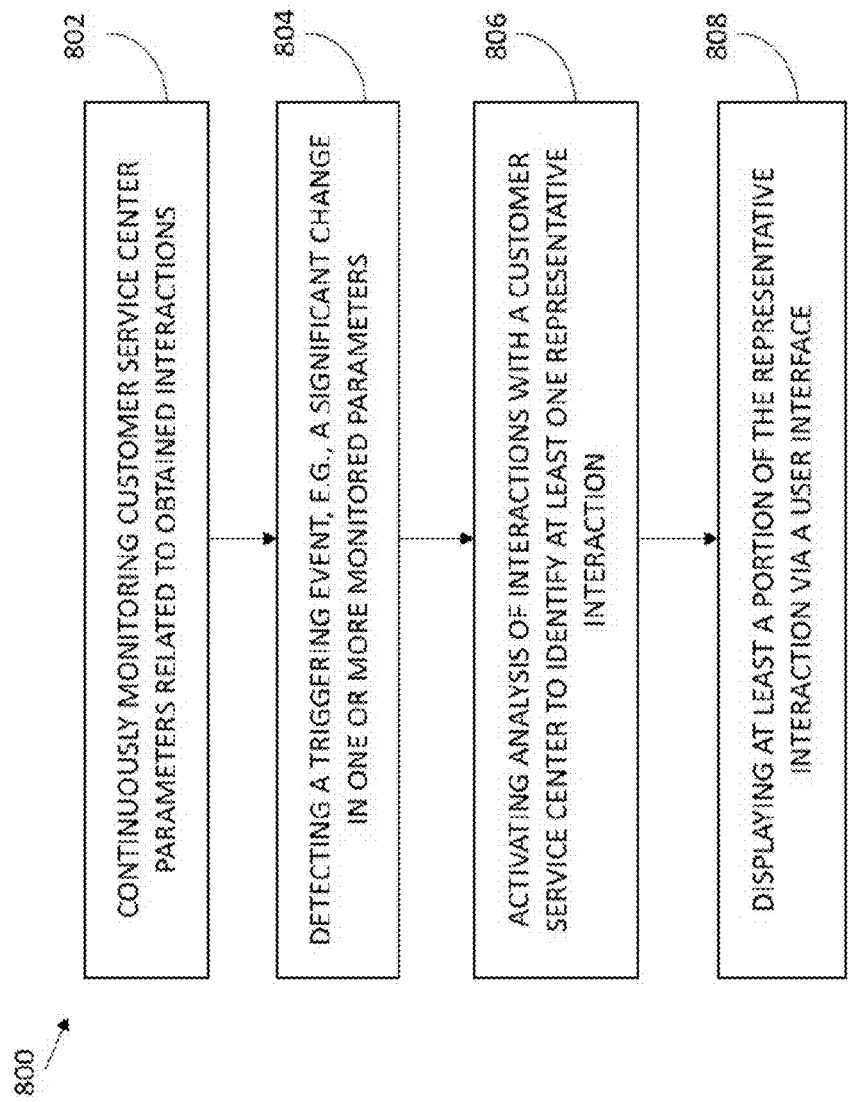
Figure 9A:
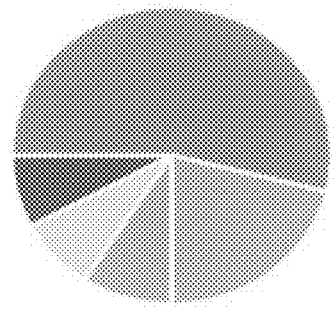

FIG. 1A schematically illustrates the root cause refinement analysis unit, as part of the entire system for analyzing interactions with a customer service center, according to an embodiment of the invention;

FIG. 1B schematically illustrates a system for analysis of interactions with a customer service center, according to an embodiment of the invention;

FIG. 2 is a schematic flowchart of inputs, outputs and corresponding operations performed for analysis of interactions with a customer service center, according to embodiments of the invention;

FIG. 3 is a schematic flow chart of a method for proximity analysis, according to embodiments of the invention;

FIG. 4 is a schematic flow chart of a method for identifying topics, according to embodiments of the invention;

FIG. 5 is a schematic flow chart of a method for filtering edges of a weighted graph, which is a sub step of identifying topics, according to embodiments of the invention;

FIG. 6 is a schematic flow chart of a method for displaying at least a portion of a representative interaction, according to embodiments of the invention;

FIG. 7A is a schematic flow chart of performed method for analysis of interactions with a customer service center, according to an embodiment of the invention;

FIG. 7B is a schematic flow chart of an example of inputs, outputs, and corresponding operations performed for analysis of interactions with a customer service center, according to one embodiment of the invention;

FIG. 8 is a schematic flow chart of performed method for preparing an investigation report regarding a change in one or more monitored parameters related to obtained interactions of a customer service center, according to embodiments of the invention;

FIGS. 9A-9B schematically illustrate a first part and a second part, respectively, of an investigation report regarding monitored parameters related to obtained interactions of a customer service center, according to embodiments of the invention.

DETAILED DESCRIPTION

In the context of some embodiments of the present disclosure, without limiting, an interaction may be any form of communication initiated by a customer, which is received by a customer service center. The interaction may be an audio communication, e.g., a phone call, which may undergo speech-to-text analysis prior to going through text processing. In other cases, the interaction may be any one of the following: an email, a chat message, a communication via social media or a survey, input provided via a website form, or any other type of written communication or verbal communication (e.g. video or audio) which may undergo speech and/or text processing, as one of the preliminary steps of analyzing interactions in order to determine which root cause(s) customer(s) may be subject to.

The terms cited above denote also inflections and conjugates thereof.

One technical problem dealt by the disclosed subject matter is recognizing root-cause issues quickly and without undue effort. In call centers or customer service centers, calls or interactions received from the customers by the customer service center, may be recorded and analyzed in order to determine whether any issues exist that may be reoccurring among a majority of customers or even more than one customer. Today, in order to analyze such communications from the customers, various methods are used, for example automatic processing of communications with customers to obtain a word cloud format that displays the most repeated words that are identified in a plurality of communications. However, when a customer service supervisor or engineer tries to analyze a root cause of a problem after receiving the word cloud, it may prove a cumbersome task, which in some cases, may be performed only by very experienced employees who are trained to analyze such problems. In some cases, it is difficult to train employees to perform such analysis tasks in a quick and efficient manner. Furthermore, in most organizations, the number of people who are trained for such analysis tasks may be very limited. In some organizations, since human and technical resources are limited, only large-scale issues that affect all or a majority of customers are addressed, while other small-scale issue are left unattended.

The result may be that determining root cause of a problem reported by multiple customers may take much longer than required. If reoccurring call center issues exist, for example, repeated disconnections in a certain geographic area, various billing issues, e.g., issued bills are too high, problems during mobile phone upgrades, cancellations or terminations of client accounts, these issues need to be addressed quickly and efficiently in order to avoid additional customers or users becoming dissatisfied with the product or service.

One technical solution according to the disclosed subject matter is automatically analyzing interactions and automatically identifying an interaction topic or topics, which correspond to root causes. Identifying an interaction topic (or an underlying reason for an issue) quickly and efficiently, by a myriad of employees rather than only the employees skilled and trained for analysis of interactions, may greatly reduce the time required for determining a root cause and resolving the problem, thus improving service quality, and enhancing customers' satisfaction.

Another technical solution according to the disclosed subject matter is displaying in a coherent manner a reduced number of communications, or portions thereof e.g. a list of snippets, to allow a quick and accurate determination of one or more root causes associated with issues communicated by or reported by multiple customers of a customer service center. A quick determination of the root causes may enable to address and repair all or a majority of the reported issues within a short time, which is quite limited when implementing current methods, due to shortage of resources. A snippet, when referred to herein, may be a portion of an interaction or a customer communication, a section or a brief extract from the interaction, for example several sentences or phrases or portions thereof. In some embodiments, the snippet may be a continuous segment of an interaction, while in other embodiments the snippet may include several non-sequential portions or segments (e.g. phrases or sentences) of an interaction.

Reference is now made to FIG. 1A, which schematically illustrates the root cause refinement analysis unit, as part of the entire system for analyzing interactions with a customer service center, according to an embodiment of the invention. In some embodiments, interaction analysis system 100 may receive recorded interactions in several forms, for example, an audio/video interaction 101, or text interactions, e.g., email 102, chat or instant message 103, social media 104 and survey 105. Interaction analysis system 100 may comprise a speech-to-text unit 110, which may be configured to transform the recorded audio interaction 101 into a text format interaction. System 100 may further comprise a text processing unit 120, which may be configured to process the text of either the initially recorded audio/video interaction 101, or the text of text interactions 102, 103, 104 and 105.

In some embodiments, text processing unit 120 may be configured to generate a word cloud computed for a plurality of customer service interactions, for example such as word cloud 752 of FIG. 7B. The word cloud may comprise a plurality of words selected from the recorded customer service interactions, which, as explained above, may be selected from several interactions types, whether audio, e.g., audio interaction 101 or whether text, e.g., email interaction 102, chat interaction 103, social media interaction 104 or survey interaction 105. The generated word cloud may include most repeated words, or words appearing with the highest frequency, which were identified in a plurality of interactions. In some embodiments, certain words such as prepositions, connectors, pronouns, etc. may be filtered from the word cloud. The size of each word displayed in the word cloud may correspond to the number of times that the word was identified in the plurality of interactions. Generating a word cloud may be according to methods such as follows (see e.g., en.wikipedia.org/wiki/Tag_cloud)

$$s_i = \left\lceil \frac{f_{max} \cdot (t_i - t_{min})}{t_{max} - t_{min}} \right\rceil \text{ for } t_i > t_{min}, \text{ else } s_i = 1 \quad \text{FORMULA A}$$

wherein $s_i$ is the display font size, $f_{max}$ is the maximum font size, $t_i$ is a count, $t_{min}$ is the minimum count, and $t_{max}$ is the maximum count. An example for a vendor that creates word clouds is Wordle (see www.wordle.net/).

System 100 may further comprise search grid unit 130, which may be a search engine, e.g. a distributed search engine. Search grid unit 130 may be configured to store a large number of interactions and enable a fast search for interactions that match specific predetermined parameters, such as date and category, or interactions that contain specific words.

System 100 may comprise an initial root-cause analysis unit 140, which may be configured to analyze customer service interactions in order to determine one or more root-causes of customer reports to a customer service center. However, since root-cause analysis unit 140 represents a typical root-cause analysis unit currently used, e.g. a word cloud generator, it does not provide a sufficiently clear display of identified problems to the analysts, even to skilled ones. Thus, root-cause refinement system 150 is implemented as part of system 100. That is, in order to provide a simplified display of communications or portions thereof that represent root-causes of issues reported by customers, root-cause refinement system 150 is incorporated within system 100, as will be explained in detail.

Reference is now made to FIG. 1B, which schematically illustrates a system for analysis of interactions with a customer service center, according to an embodiment of the invention. Root-cause refinement unit or system 150 may comprise or may be operationally connected to a user interface 151, which may be configured to accept and record customer service interactions with users or customers. Root-cause refinement system 150 may comprise or may be operationally connected to a storage unit 152, which may be configured to store the recorded interactions as well as a word cloud generated by a word cloud generator 153.

Word cloud generator 153 may be a dedicated processing unit configured to generate a word cloud, or may be a program or software service configured to receive an input of customer service communications or interactions and to provide a corresponding output of a word cloud to root-cause refinement system 150. It is noted that in some embodiments, the word cloud generator 153 is not necessarily a part of root cause refinement system 150. For example, root cause refinement system 150 may be configured to receive a word cloud generated for a plurality of communications with customers from an external processor or generator. The word cloud may be generated based on words or phrases selected by the word cloud generator from the recorded interactions.

Root-cause refinement system 150 may further comprise a root cause analysis unit 154, which may be configured to receive the word cloud from storage 152 and to consolidate similar words (e.g. semantically similar or having the same or similar meaning), or analogous words, or synonymous words into word sets. Analysis unit 154 may further be configured to calculate a proximity score for a pair of the word sets, whereby the proximity score corresponds to a degree of affinity between the word sets of the pair.

The proximity score may be based on co-occurrences of words from the two word sets within a predefined portion of the same interaction, and/or on the distance between the location of the words in one or more interactions. For example, if words from the two word sets appear in the same interaction a plurality of times, or at least more than a predetermined amount of times within a predefined portion of the same interaction, or if the words appear relatively close to each other e.g., in the same sentence or in consecutive sentences, or if any word from the first word set appears with any word from the second word set within a portion of the same interaction, e.g., along several consecutive sentences of the same interaction. E.g., if a first word set comprises the words: (warm, hot, burning) and a second word set comprises the word: (battery), in order to calculate the proximity score for this pair of word sets, the co-occurrences of words from these two word sets within a portion of an interaction may be determined. For example, a portion of an interaction wherein any word from the first word set appears along with or in close proximity to the word of the second word set may include the following two sentences: "The battery of my phone is burning hot. I think it is because I installed the latest android update two days ago . . . ". In this example, it is determined that the word 'burning' and the word 'hot' from the first word set appear in close proximity to the word 'battery' from the second word set, e.g., the words from the two word sets appear within the same sentence with a distance of only 4 words apart. Accordingly, a high or relatively high proximity score may be assigned to the exemplified pair of word sets, and accordingly the weight of the edge connecting these two word sets in the graph is assigned to be high or relatively high weight. However, if the words from the two word sets did not appear within the same portion of the interaction, or if the words from the two word sets did not appear more than once within the same portion of the interaction, a low proximity score is assigned to the exemplified pair of word sets, corresponding to a low or relatively low weight of the edge in the graph that connects these two word sets.

Analysis unit 154 may further be configured to construct a weighted graph of the word sets based on the calculated proximity scores, to identify one or more subsets of word sets in the graph, each subset of word sets corresponding to an interaction topic, or issue and to generate a query for an interaction topic based on the corresponding subset of word sets. The weighted graph may include word sets designated as vertices of the graph, and the weight designated for an edge may be (or may correspond to) the calculated proximity scores between a pair of word sets that the edge connects.

Analysis unit 154 may be configured to compare weight designated for edges of the weighted graph with a predetermined rule or condition, e.g., a predetermined weight threshold, and to remove edges comprising weight below the predetermined threshold from the weighted graph. Analysis unit 154 may be configured to identify cliques or subsets of word set within the weighted graph, which may comprise edges connecting between any two word sets within the clique. In some embodiments, analysis unit 154 may be configured to filter the cliques such that the weighted graph would include a reduced number of cliques, which represent the main topics or issues related to root causes that are raised during interactions between customers or users and the customer service center. In order to perform clique filtration, analysis unit 154 may be configured to calculate the size and weight values per each clique, to compare the calculated size and weight values per each clique to a predetermined threshold or range, and to remove cliques that are above or below the predetermined size and weight values thresholds or within the predetermined range, in order to obtain a reduced number of cliques. In some embodiments, the weight values may comprise average weight.

Analysis unit 154 may be configured to generate a query based on the words that each clique or subset of word sets comprises. In some embodiments, analysis unit 154 may further be configured to retrieve customer service interactions that match the generated query, to select a representative interaction from the retrieved customer service interactions, based on one or more predetermined parameters, and to display, via user interface 151, at least a portion of the representative interaction for the selected identified topic or issue. For example, user interface 151 may display a snippet of the representative interaction per the selected identified topic.

Reference is now made to FIG. 2, which is a schematic flowchart of inputs, outputs and corresponding operations of a method for analysis of interactions with a customer service center, according to embodiments of the invention. FIG. 2 schematically illustrates the steps that may be performed by analysis unit 154 (FIG. 1B), and the inputs and outputs that correspond to these steps. According to some embodiments, analysis unit 154 may be configured to perform semantic consolidation, as in step 201, followed by proximity analysis in step 202, identifying topics in step 203 and finding a representative interaction, or a portion thereof (e.g. a snippet) to represent the identified topic in step 204. The snippet that may be displayed to the user may correspond to a root-cause issue that is to be notified to the user.

In some embodiments, the input into step 201 of semantic consolidation may be input 210, which comprises a word cloud. A word cloud may comprise a display of words selected from the recorded interactions. Words such as connectors or propositions used in grammar are typically excluded from the word cloud, since they do not convey a substantial subject, theme, issue or topic. The remaining words may then be counted, and arranged in an order according to appearance along the interactions, e.g., in a descending order of occurrence within the interactions. If the total number of words high, e.g., compared to a predetermined threshold, a maximum number of words that is below the threshold may be selected, and all top words that correspond to the max number of words, and which appeared for the largest number of times are included in the word cloud. For example, if 100 words remain after exclusion of connectors and propositions, and 100 words are too many words to be included in the word cloud, then a max of 50 words may be selected, and the top 50 words that appeared the largest number of times may be included in the word cloud.

The word cloud may be displayed such that a word appearing at a high frequency (e.g., frequently, or a large number of times) within text of the recorded interactions, may be displayed in a large and/or emphasized font, e.g., bold or highlighted, while a word that appears at a low frequency among the recorded interactions (e.g., appears occasionally or intermittently or appears a relatively small number of times in text of the recorded interactions), may be displayed at a small and non-emphasized font, e.g., thin or non-highlighted. For example, various thresholds or rules may be used to determine a frequency level or frequency score, which may be associated with a word identified in one or more interactions. According to its frequency score, a word may be displayed in the word cloud using a designated font size, font shape and/or other font characteristics (such as bold font, underlined font, italics, etc.).

Typically, connectors or prepositions used in grammar such as: 'before', 'that', 'from', 'still', 'in', 'for', etc., are filtered from or not included in the word cloud, since they do not convey a substantial subject, theme, topic or issue. Similarly, adjectives or words that are descriptive (e.g. very, large, blue) may receive a reduced score or importance. The word cloud may be generated by a processor operating software instructions configured to generate a word cloud from a set of interactions, e.g., word cloud generator 153 (FIG. 1B). The word cloud may then be further processed by analysis unit 154 during step 201. During step 201 the word cloud is processed such that semantically similar words or synonymous words are consolidated or clustered into word sets. That is, the output generated after step 201 is illustrated by box 211 as a data construct, e.g. an array, of similar word sets. For example, words such as: cold, freeze, and cool may be consolidated into one word set. The data construct may be stored in a storage unit associated with the analysis unit 154 and/or incorporated therein.

In some embodiments, following consolidation performed by step 201, analysis unit 154 may perform step 202, which comprises proximity analysis. The output of step 201, e.g. the construct or array of similar word sets is now the input of step 202, which is illustrated by box 220. During step 202 the word sets are used to construct a complete weighted graph, in which every two vertices are adjacent such that all edges that can exist are constructed. The weights on each edge may be constructed based on a proximity score that corresponds to the affinity of pairs of words sets. That is, per any pair of word sets of input 220, a proximity score is calculated. The proximity score may be based on co-occurrences of words from a pair of word sets within a predefined portion of the same interaction, and/or the distance between the words in one or more interactions, e.g., how often and where words from the pair of word sets appear along an interaction or along all interactions, or along one sentence or consecutive sentences within an interaction, etc. The proximity score may be a number, e.g. between 0 and 100, though any other scale may be implemented. Once the proximity score is calculated per any pair of word sets, the entire weighted graph may be constructed, while the nodes or vertices of the graph are the words sets and the proximity score or weight is associated with each edge that connects a pair of word sets (or two vertices). Typically, the edges of the constructed graph are undirected. The output of step 202 is thus a complete weighted undirected graph or a digital representation thereof, as depicted in box 221.

In some embodiments, only the interactions of dissatisfied users are used as basis for generating the word cloud and thus for constructing the weighted graph. That is, the word cloud and weighted graph are generated from interactions that are already tagged as including problematic or challenging issues, and the next step is analyzing these interactions in order to determine what the root-causes of the issues are. However, in other embodiments, all interactions may be considered or used when generating the word cloud, such that all words from all interactions are the basis for generating the word cloud. This latter method may ensure higher assurance with respect to detection of the most important root-cause issues, since all interactions are taken into consideration.

The output 221, which includes a weighted graph or a representation thereof, is then provided in the analysis unit 154 as the input 230 of step 203. During step 203, analysis unit 154 may be configured to identify topics, which may correspond to root-causes of dissatisfaction expressed by users via the interactions. Step 203 may comprise several operations. In operation 203.1, edges of the weighted graph may be filtered such that edges that match a predetermined rule or condition, e.g. edges having a weight below a predetermined threshold, are removed from the weighted graph, thus obtaining a filtered or reduced set of edges. One example of a predetermined threshold, may be a predetermined weight or predetermined proximity score such that below it, the edge is removed from the weighted graph. For example, the threshold may be a weight of 20, though any other weight or proximity score may be selected.

In operation 203.2, analysis unit 154 may be configured to find subsets of vertices in the weighted graph. Subsets of vertices in the weighted graph may be vertices that comprise a subgraph, e.g. a complete subgraph or a clique or a maximal complete subgraph, e.g. with edges connecting all vertices of the complete subgraph, such that any word set of the complete subgraph is connected to any other word set of the complete subgraph by a common edge. Each complete subgraph or clique may represent a topic or a subject, which may correspond to a root-cause of a reported issue.

Once the weighted graph is divided into cliques or complete subgraphs, in operation 203.3 the cliques or subsets of vertices are filtered based on one or more predetermined parameters. For example, the cliques may be filtered based on the size of the clique, e.g., the number of vertices included in the clique. For example, subgraphs or cliques with a number of nodes above a first threshold, e.g. above seven, may be removed from the weighted graph, since this may mean that the clique is too large and thus too broad or includes too many words sets for efficiently or accurately defining a specific root-cause. In a different example, subgraphs or cliques including a number of nodes that is lower than a second threshold, e.g. below three are removed from the weighted graph, since these cliques represent cliques that may be too small, such that these vertices subsets do not contain enough information for properly or effectively defining a root-cause. In yet another example, subgraphs or cliques that satisfy more than one condition may be removed from the graph, e.g. subgraphs or cliques having more than seven vertices or having less than three vertices are removed from the weighted graph. In other cases, the subgraphs or cliques may be filtered based on the average weight of the subgraph or clique. An average weight of a clique may be calculated by summarizing all weights (e.g., proximity scores) of the edges of the vertices in the clique, and dividing the sum by the number of edges left in the clique, e.g. after filtering edges that conform to certain conditions. In some embodiments, the average weight may be calculated according to the following equation:

$$\text{Average weight} = \frac{1}{n}\Sigma_{e \text{ in } \{edges\}} W_e, ; \quad \text{FORMULA B}$$

wherein n is the number of edges (in the clique), and $W_e$ is the weight associated with the edge.

For example, cliques with an average weight below 30 may be removed from the weighted graph. Any other predetermined average weight related threshold may be implemented.

In some embodiments, the cliques may be filtered based on a combination of number of vertices in the clique and the average weight of the clique, and/or according to one or more other parameters or combinations thereof.

According to some embodiments, the output of step 203 is illustrated in box 231 as subsets of word sets, e.g., a group of cliques that may represent different topics or subjects that were raised by users communicating with the service center, during the recorded interactions. This output 231 is provided by analysis unit 154 as the input 240 of step 204. During step 204, input 240 comprising subsets of word sets (or cliques) are processed in order to detect representative interactions or portions thereof e.g. representative snippets indicating a root cause. A snippet may be at least a portion of an interaction that includes at least one of the words that appeared in the cliques or subsets that were determined in step 203. A snippet may indicate or elucidate or correspond to a specific root-cause of an issue, which may be automatically identified in customer interactions according to methods described herein.

In some embodiments, during operation 204.1 a query is generated by analysis unit 154, for each subset of word sets or for each clique, based on the words that are included in the subset. For example, the query may be automatically generated to include, between words of the same word sets (or same vertices), an 'OR' operation, while between different word sets (or between different vertices) the query may include an 'AND' operation. For example, if a clique or subset of word sets comprises the following word sets: [word set I: {warm, hot burning}, word set II: {firmware}, word set III: {LG, Samsung, phone}], the query may be generated as follows: (warm OR hot OR burning) AND firmware AND (lg OR samsung OR phone).

In operation 204.2, analysis unit 154 may be configured to apply the generated query in order to retrieve interactions matching that query, from an interaction database or storage, e.g., storage unit 152 (FIG. 1B). In operation 204.2, the query may be used in order to detect and retrieve interactions that comprise all or the majority of the words that make up in the query, e.g., at least one word of each word set in the query.

In operation 204.3, analysis unit 154 may be configured to calculate a score for each retrieved interaction based on one or more predetermined parameters. The retrieved interaction score may reflect the level of similarity between the query and the retrieved interactions. The retrieved interaction score, which may be calculated based on a relevance function, may reveal the degree of similarity or correspondence between the retrieved interaction and the words that make up the query. Two factors may be considered when designing a relevance function: (1) the number of common words that appear both in the query and in the retrieved interaction, and/or (2) how close or similar these words are to one other. For example, such a relevance function may include a parameter relating to the number of common or joint words that appear both in the query and in the interaction (occurring words) and/or a parameter relating to the distance (e.g., measured in number of words) between location of the first joint word in the interaction, said joint word is included in the query to the last joint word in the interaction, said joint word is included in the query. For example, the following exemplary formula of a relevance function may be used to calculate a retrieved interaction score (RS):

$$RS = \log(\text{occurring\_words}) + 1/(\text{last\_word\_index} - \text{first\_word\_index})) \quad \text{Formula C1}$$

wherein the last_word index indicates the location (in the interaction) of the last joint word that appears both in the interaction and in the query, e.g. if the last joint word in the interaction appeared as the $20^{th}$ word, it would receive a value of 20, and the first_word_index indicates the location of a first common word between the query and the interaction, e.g. if the first joint word in the interaction appeared as the $10^{th}$ word, then the value of the first_word_index is 10.

Another exemplary formula of a relevance function that may be used to calculate a retrieved interaction score may be as follows:

$$RS = 2*|\text{occuring\_words}| - (\text{last\_word\_index} - \text{first\_word\_index})/|\text{occurring\_words}| \quad \text{FORMULA C2}$$

wherein occurring_words denotes the number of common or joint words (word sets) that appear both in the query and in the interaction, last_word_index denotes the location (in the interaction) of the last common word that appears both in the interaction and in the query, and first_word_index denotes the location (in the interaction) of the first common word that appears both in the interaction and in the query.

In operation 204.4, a representative interaction is selected from the retrieved interactions, based on the retrieved interaction relevance score. Typically, the retrieved interaction assigned with the highest relevance score, e.g., the interaction that is most similar to the words included in the query, is the interaction selected in operation 204.4. In some embodiments, more than one representative interaction may be selected, for example according to the relevance scores.

Optionally, in operation 204.5, analysis unit 154 may determine and display a representing snippet from the one or more representative interactions. The representing snippet may comprise at least a portion of the representative interaction, and in some embodiments only the representing snippet may be displayed to the user of system 150. The representing snippet may comprise at least one word of each of the word sets that appear in the query. The representing snippet may be displayed via the user interface of the system, e.g., user interface 151 (FIG. 1B). The representing snippet may correspond to or may indicate a root-cause that may affect one or more users, who contacted the customer service center via interactions of any kind.

In some embodiments, there may be more than one clique or subset of word sets, thus more than one query automatically generated and searched for among the interactions, which may lead to more than one root-cause that may be displayed as an interaction or portion thereof, e.g. a snippet selected from a corresponding representative interaction. While displaying the snippets that correspond to root-causes, the user interface may further be configured to display an estimated or calculated volume of the identified topics, e.g., complaints associated with that root-cause (e.g., how many users were affected by the same root-cause), which may be determined, for example, based on the number of interactions or distinct interactions that were retrieved per a corresponding query. It should be evident that an interaction may be relevant to more than one clique or more than one subset of word sets, thus the same interaction may be counted per more than one root-cause when determining the volume of complaints associated with a certain root-cause.

The output of step 204, and of the entire method performed by analysis unit 154, is thus one or more representative interactions, or one or more portions of one or more representative interactions, e.g., a representing snippet, as illustrated by box 241.

Reference is now made to FIG. 3, which is a schematic flow chart of a method for proximity analysis and weighted graph construction, according to embodiments of the invention. In order to accomplish step 202 of proximity analysis (FIG. 2), a weighted graph comprising edges and nodes must be constructed. Box 302 denotes the beginning of the algorithm. In operation 304, a plurality of word sets are received from the word cloud. Word sets are synonymous words or semantically similar words appearing as part of the word cloud, arranged into groups of word sets or consolidated into word sets, e.g. as described with respect to step 201 (FIG. 2). Each word set is designated as a node or vertice in the weighted graph.

In order to determine a weight associated with each edge, once the word sets are received in operation 304, in operation 306, for each pair of word sets received, a proximity score is computed. The proximity score may indicate or correspond to the degree of affinity and relationship between the two word sets of the pair. In some embodiments, the proximity score may be a PMI (Point-wise Mutual Information) score, or NPMI (Normalized PMI) score, which is computed for sets of words rather than just for a pair of single words. For example, NPMI may be computed for a pair comprising word set X and word set Y as follows (e.g., see en.wikipedia.org/wiki/Pointwise_mutual_information):

$$PMI(x, y) = \log_2 \frac{p(x, y)}{p(x)p(y)} = \log_2 \frac{p(y|x)p(x)}{p(x)p(y)} = \log_2 \frac{p(y|x)}{p(y)} \quad \text{Formula D}$$

$$NPMI(x, y) = \frac{PMI(x, y)}{-\log_2 p(x, y)} \quad \text{Formula E}$$

Whereby:

$$p(y|x) = \frac{c(x, y)}{c(x)}$$

c(x,y) is the number of co-occurrences of words in the word sets. The occurrence happens when any word from word set X appears with any word from word set Y in the same interaction within a predefined window (e.g., within a predefined number of words or sentences).

and $$p(x) = \frac{c(x)}{c(\text{words})}; \quad p(y) = \frac{c(y)}{c(\text{words})}$$

c(words) is the number of words in the set of interactions.

Other embodiments may implement other proximity scores for computing the proximity score or degree of affinity between pairs of word sets.

In operation 308, an edge weight is assigned per each edge that connects a pair of word sets. The edge weight may be based on the computed proximity score, for example, it may be the proximity score or a linear or non-linear combination of the proximity score and other characteristics or parameters associated with the edge and/or with the vertices (word sets) of the pair. Once the edge weight is computed, the edge along with the edge weight may be added to the graph, thereby generating a weighted graph.

In operation 310, the analysis unit (e.g. analysis unit 154) may check whether there are more pairs to be assigned with an edge weight. If there are more pairs, then operation 304 is repeated, whereas in case there are no more pairs, the proximity score computation ends, as denoted by box 312.

In some embodiments, the graph is initially constructed as a complete weighted graph, in which all vertices are connected to each other. In other words, in a connected graph (or subgraph) every two vertices have an edge between them.

Reference is now made to FIG. 4, which is a schematic flow chart of operations of a method for identifying subjects or topics, according to embodiments of the invention. In order to complete step 203 of identifying topics (FIG. 2) and thus to reconstruct the complete weighted graph into several cliques, each clique representing a single topic, there are a few operations that need to be fulfilled. Box 402 denotes the beginning of such operations. Then, in operation 404, edges that satisfy one or more predetermined rules or conditions are filtered, e.g. removed, from the complete weighted graph. One example for a predetermined condition may be a certain edge weight threshold such that any edge assigned with an edge weight below the edge weight threshold, is removed from the graph. For example, the edge weight threshold may be 30, while the edge weights may be on the scale of 1 to 100. Thus, any edge with an edge weight below 30, is removed from the weighted graph. In other embodiments, other thresholds and other scales may be implemented. In some embodiments, the condition may be based on a range of valid weights, for example, any edge that is associated with a weight, which is smaller than 20 or larger than 80 may be removed from the graph.

Following operation 404, in operation 406 complete connected subgraphs or cliques. e.g. connected subsets of vertices or word sets, are found in the filtered weighted graph. Identifying complete connected subgraphs includes determining a subset of word sets that are connected via edges to all other word sets in the subgraph. Each complete connected subgraph or each clique may represent a single topic, which may correspond to a root-cause of an issue reported by a customer. In some embodiments, operation 406 may be implemented using known clique-identification algorithms, e.g., Bron-Kerbosch algorithm en.wikipedia.org/wiki/Bron%E2%80%93Kerbosch_algorithm for finding maximal cliques in an undirected graph. In other embodiments, other algorithms for finding cliques may be used. Following operation 406, all the complete connected subgraphs or cliques in the graph are determined.

In operation 408, an indication is made as to whether a subgraph or a subset of word sets satisfies one or more predetermined conditions, in order to filter and remove subsets that do not satisfy the predetermined condition. An exemplary predetermined condition may be based on the size of the subgraph (number of nodes in it), the average weight of the subgraph, or any other parameter. If the subgraph does not satisfy the one or more conditions, in operation 410 the subgraph is ignored, and not taken into consideration when identifying topics that may correspond to root-causes. However, if the subgraph does satisfy the condition, in operation 412 it is determined whether additional subgraphs are to be analyzed in the filtered or reduced weighted graph. If there are more subgraphs, operation 406 is repeated, however, if there are no more subgraphs, operations directed to identifying topics or subjects in customer center interactions are complete per step 203, as denoted by box 414.

Reference is now made to FIG. 5, which is a schematic flow chart of a method for filtering edges, which is an operation that facilitates identifying topics, according to embodiments of the invention. Operation 404 of filtering edges of the weighted graph (FIG. 4), which is also disclosed in FIG. 2 as sub-step 203.1 may include several operations that are required in order to accomplish the filtration or removal of edges from the weighted graph. Box 502 denotes the start point of the filtration method. In operation 504 an edge in the graph is identified.

In operation 506, a determination is made as to whether the edge weight of the identified edge satisfies at least a predetermined condition. For example, a determination is made, e.g. by analysis unit 154, whether the edge weight, is above or below a predetermined threshold, or within a threshold range. For example, a certain value of edge weight is determined as the threshold, such that any edge with an edge weight below the threshold is removed from the weighted graph, and any edge with an edge weight above the threshold is kept as part of the weighted graph. For example, the edge weight threshold may be predetermined as any threshold between 20 to 40, e.g., 35, wherein the scale of edge weight is between 1 and 100. In other embodiments, one or more different edge weight thresholds, or a threshold range, and/or other scales may be implemented.

If the edge weight does not satisfy the predetermined condition, e.g. the edge weight is below the threshold, the edge assigned with that edge weight is removed from the weighted graph, as in operation 508. However, if the edge weight satisfies the predetermined condition, e.g. the edge weight is above the threshold, the edge assigned with that edge weight is kept as part of the weighted graph and in operation 510 a determination is made with respect to whether additional edges are incorporated within the weighted graph and are to be analyzed. If there are more edges, the analysis unit may returns to operation 504, whereas if there are no more edges for analysis, the filtering edges operation is complete, as denoted by box 512.

Reference is now made to FIG. 6, which is a schematic flow chart of operations of a method for displaying at least a portion of a representative interaction, according to embodiments of the invention. Several operations are required in order to complete step 204 (FIG. 2) of finding a representative interaction, or a portion thereof, e.g. a snippet. Box 602 denotes the beginning of the method for finding of a representative interaction or at least a portion thereof, e.g. a snippet.

In operation 604, a query may be automatically generated, e.g. by analysis unit 154, for each subgraph of word sets, or per each clique in the graph. The query may be generated based on all or at least a portion of the words in the subgraph. The query may include operators such as 'OR', 'AND' or 'NOT'. In one embodiment, the query may be constructed such that an 'AND' operator may be used between word sets, while an 'OR' operator may be used between words of a single word set. In operation 606, the query may be applied to an interactions database or storage unit or data construct, for example storage unit 152 (FIG. 1B), which may be configured to store the recorded interactions. Interactions that match the query are retrieved from the interaction storage unit.

In operation 608, a score for the retrieved interactions is calculated. The retrieved interaction score may be calculated and assigned per each retrieved interaction, based on relevance and/or resemblance of the retrieved interaction to the query. In some embodiments, a relevance function, which may be a function used by the analysis unit 154 for sorting and scoring the retrieved interactions, may be implemented. The interactions may be sorted and/or scored based on one or more parameters, for example the number of words that appear in the clique as well as in the retrieved interactions. Another parameter may be the degree of similarity between the words in the query and the words that appear in the retrieved interactions. The retrieved interaction score may be based on a linear or non-linear combination of one or more parameters. A retrieved interaction score may be calculated according to Formula C1, Formula C2 (both formulas described hereinabove) or any other relevance function related formula.

According to Formula C2, the retrieved interaction score is constructed from two parameters: (1) the number of words in each word set of the subgraph/clique, which occur/appear in the retrieved interaction and (2) the minimal distance between the first and the last occurring words in the retrieved interaction. The minimal distance may be normalized by the number of words occurring in the retrieved interaction. For example, if the occurring words, e.g., the words that appear in the interaction are: 'warm' (word number 15 along the interaction), 'burning' (word no. 21), 'LG' (word no. 10), 'phone' (word no. 16) and 'battery' (word no. 22), then the following applies:

| Parameter | Value |
| --- | --- |
| Occurring words | There are 3 occurring words (since 'warn' and 'burning' belong to a single word set (same node or vertice) and 'phone' and 'LG' belong to the another single word set) |
| Distance | 22 − 15/3 = 2.33 |
| retrievedinteraction score | 2 * 3 − 2.33 = 3.67 |

Thus, in this example, the score calculated per this retrieved interaction is 3.67, which may then be compared to a threshold or predetermined condition, as in operation 610. Alternatively, the retrieved interactions that received the highest or best result/s may be selected. In one example, a predetermined number of; e.g., three results, may be selected.

In operation 610, determination is made whether the retrieved interaction corresponds with or satisfies a predetermined condition. The predetermined condition may be based on the number of words of the clique/subset of word sets that appear in the retrieved interaction, and/or on similarity between words in the query and those that appear in the retrieved interaction, and/or on other parameters.

In case the retrieved interaction corresponds with the predetermined condition, or alternatively in case the retrieved interaction was assigned a high score or the highest score compared to other retrieved interactions, in operation 612, the retrieved interaction is selected as a representative interaction, and the representative interaction or a portion thereof, e.g. a snippet from the representative interaction, may be determined and displayed, e.g., via user interface 151 (FIG. 1B). It is noted that in some embodiments, more than one interaction may be selected as a set of representative interactions. In case the retrieved interaction does not correspond with the predetermined condition, in operation 614, the retrieved interaction is ignored, and other additional retrieved interactions are searched for in operation 616, until there are no more retrieved interactions for analysis, as denoted by box 618. In case there are more retrieved interactions, the algorithm for finding a snippet returns to operation 610, where another retrieved interaction is compared to a predetermined condition.

In some embodiments, a snippet may be a phrase, a sentence or a portion thereof selected from the retrieved interaction. The snippet may include all or a majority of words that appear in the clique. In some embodiments, a snippet may comprise substantially all or a majority of words included in the corresponding query, wherein the words of the query appear in the retrieved interaction or portion thereof at a location that is between a few words prior to the location of any word of the query that appears first in the retrieved interaction, to a few words after the location of any word of the query that appears last in the retrieved interaction. In some examples, the snippet may comprise substantially all words of the query, while these words may be located between a word assigned as the first word in the retrieved interaction, which is any word of the query that appears first in the retrieved interaction, and a word assigned as the last word in the retrieved interaction, which is any word of the query that appears last in the retrieved interaction. In some embodiments, the snippet may include two to three words prior to the word assigned as the first word of the retrieved interaction, and including two to three words after the word assigned as the last word of the retrieved interaction. For example, if a query includes: ['burning' AND 'phone' AND 'pocket'], and the interaction includes the following phrase or sentence: " . . . my phone is in my pocket. It is burning . . . ", the word 'phone' is assigned as the first word in the retrieved interaction, while the word 'burning' is assigned as the last word in the retrieved interaction, and the word 'pocket' should be located in between the words assigned as first and last in the retrieved interaction, while further taking into consideration a few words prior to the word assigned as the first word, and a few words after the word assigned as the last word.

In some embodiments, a volume or amount of interactions associated with a root-cause that is represented by the representing snippet, may be calculated and displayed in addition to the representing snippet. The volume of interactions associated with the root-cause may refer to the percentage of users that were affected by the root-cause. In some embodiments, a list of snippets representing one or different root causes may be displayed to a user. e.g., via a user interface. In some embodiments, the list of snippets may be displayed in an order according to a determined volume of each root cause, e.g., at an ascending or descending order per the volume of the root-cause. The volume of each root cause may be determined by the number of interactions retrieved by the root-cause or representing snippet's corresponding query.

Reference is now made to FIG. 7A, which is a schematic flow chart of performed method for analysis of interactions with a customer service center, for example by e.g. analysis unit 154 of FIG. 1B), according to an embodiment of the invention. FIG. 7A schematically illustrates method 700 for analysis of interactions of a customer service center, which may be performed by an analysis unit, e.g., analysis unit 154 (FIG. 1B). Step 702 may comprise receiving a word cloud. The word cloud may be received from a storage unit, e.g., storage 152. The word cloud may be the output of a processor, which is configured to process recorded interactions that are received in textual format, or are converted by a text-to-speech engine from speech to a textual format.

Step 704 may comprise consolidating, for example by analysis unit 154, similar words into word sets, such that synonymous and/or semantically similar or related words are arranged in groups or word sets. The method may further comprise step 706, which may comprise constructing a weighted graph, e.g. a complete weighted graph, from the word sets. The step of constructing a weighted graph may include calculating an edge weight per each edge of the graph, whereby an edge connects between two different word sets that are designated as the vertices of the graph. An edge weight may be calculated based on the degree of affinity or proximity between one word set to another, for example according to the proximity score described above. When each edge is assigned with its corresponding edge weight, the weighted graph may be constructed.

The method may comprise step 708, which may comprise comparing the edge weights in the weighted graph with a predetermined weight threshold or another rule or condition, for example by analysis unit 154. Step 710 may comprise removing edges comprising edge weight that is below the weight threshold. This step is performed in order to remove access of edges that their edge weight does not exceed the predetermined threshold, and thus to filter out edges that do not provide relevant information per possible root-causes.

Step 712 may comprise identifying cliques within the weighted graph, for example by analysis unit 154. Cliques may include subsets of word sets or complete subgraphs. That is, every two distinct vertices (word sets) in the clique are adjacent or interconnected by an edge. Cliques or subset of word sets may represent a topic or subject of a recorded interaction. Identifying cliques in the graph may allow identifying various topics discussed between the user and the customer service center during the recorded interactions.

In one embodiment, following step 712, the method may comprise filtering the cliques. FIG. 7A illustrates an example of how filtering cliques in a graph may be performed, e.g., in steps 714, 716 and 718, for example by analysis unit 154. Step 714 may comprise calculating the size and weight of each clique. The size of a clique may be determined based on the number of words in the clique, or the number of word sets in the clique, and so on. The weight of a clique may be determined, for example, based on the average edge weight of all edges within the clique, or based on a maximal weight in the clique, or a minimal weight, etc. Step 716 may comprise comparing the calculated size and weight of each clique to a corresponding threshold or to a set of rules and conditions, and step 718 may comprise removing from the graph cliques that remain after the filtering phase, e.g. cliques that are above or below the size and weight thresholds in order to obtain a reduced number of cliques.

Step 720 may comprise per each clique, generating a corresponding query from the words in the clique, for example by analysis unit 154. Each query may be used in order to search for interactions that correspond with the clique that the query is based on. Step 722 may comprise retrieving interactions from an interaction database that match the generated query. The interaction database may be stored in a storage unit operationally connected to the analysis unit, e.g. in storage 152. Determining a match between a query and an interaction may be based on the number of words of the query that appear in the interaction, and/or on similarity between the words that appear in the interaction and in the query.

Step 724 may comprise selecting at least one representative interaction based on one or more clique parameters, e.g. by determining the relevance of the interaction, or calculating a retrieved interaction score, such as based on the number of clique words that appear in an interaction and/or on how close these clique words are to the words in the query, per each clique. In some embodiments, the representative interaction is the interaction that includes a majority or substantially all words of the query, and thus substantially all words of the clique. Furthermore, the representative interaction is typically the interaction that includes words that are extremely close by being semantically identical or highly similar to the words of the query. In some embodiments, a retrieved interaction score may be calculated based on such parameters, in order to select the representative interaction according to the calculated retrieved interaction score.

Step 726 may comprise displaying the representative interaction/s or portions thereof, e.g., a snippet. The displayed snippet may include a portion of the representative interaction, e.g., at least one sentence or phrase selected from the representative interaction, such that the selected portion includes substantially all words of the clique, or at least one word of each word set that the clique comprises. The displayed snippet may represent a root-cause or an issue associated with a root-cause that may have affected a plurality of users. In some embodiments, the user interface or any other displaying means may be configured to display a list of snippets, such that all root-causes that were identified by the analysis unit from all recorded interactions during a predetermined time period, may be displayed to a user. According to some examples, instead of displaying or manually analyzing thousands of interactions, only a few snippets may be displayed to the user, thus providing a coherent display of the root-causes that were automatically identified by the analysis unit. Such display may facilitate quick and focused understanding of a root cause underlying multiple reported issues or multiple interactions with customers. In addition, a volume or degree of effect of the listed root-causes (represented via the listed snippets) on the users, may be displayed in terms of percentage of how many interactions (e.g., out of the total number of interactions during the relevant time period) included each of the root-causes (represented by the snippets).

An interaction may be relevant to or associated with more than one root-cause, since a user contacting the customer services center may encounter more than one problem. The list of snippets may be displayed in a descending or ascending order according to the volume of the root-causes that the snippets represent. In other embodiments, a root-cause may have more than one corresponding snippets, which may be displayed, either at a random order or according to parameters of the snippet with respect to parameters of the query. For example, the parameters may be the number of words of the query that appear in the snippet and/or similarity of the words that appear in the snippet to the words of the query, such that the more words of the query that appear in the snippet, the higher the rank assigned to the snippet, and so on.

Reference is now made to FIG. 7B, which is a schematic flow chart of an example of inputs, outputs, and corresponding operations performed for analysis of interactions with a customer service center, according to one embodiment of the invention. In example 750, word cloud 752 may be received. The word cloud may comprise various words that are collected from the recorded interactions during a specific time period. Words or phrases that were frequently used during the interactions are displayed using larger fonts, and possibly in an emphasized manner, e.g., may be highlighted using bold or italic font emphasis or different font colors, as compared to words that were less frequently used during the interactions. For example, word cloud 752 displays the word 'Battery' as a large word, meaning it was frequently used during the recorded interactions, whereas the word 'very' is displayed as a small word, which may indicate that it was occasionally used, or that it is a word that has low significance since it is not descriptive of an underlying reported problem or issue.

Following step 201 including semantic consolidation (see also FIG. 2), word cloud 752 is transformed into an array or other data structure of synonymous or semantically similar word sets. An example of an array of word sets of synonymous and semantically similar words is illustrated by example 754, which includes the following array: {A: {hot, burning}, B: firmware, C: {LG, Samsung, phone, Android}}. Example 754 comprises three word sets; word set A, which includes the words: {hot, burning}, word set B, which includes the word 'firmware', and word set C, which includes the words: {LG, Samsung, phone, Android}. Following step 202 of proximity analysis (FIG. 2), the words sets, as in example 754 may be constructed into a weighted graph 756. As illustrated by weighted graph 756, word sets A, B, and C are located at the nodes or vertices of the weighted graph, while edges connect between a pair of word sets. Furthermore, an edge weight is assigned per each edge. For example, the edge weight assigned to the edge connecting between word set A and word set B is 0.8, the edge weight assigned to the edge connecting between word set B to word set C is 0.6, and the edge weight assigned to the edge connecting word set A with word set C is 0.9. As explained with respect to FIG. 2, edge weight is calculated according to proximity score representing the affinity between pairs of word sets. In weighted graph 756, the scale of the edge weight is between 0 and 1, though other ranges or scales may be implemented, such as between 0 to 100, −1 to 1, and so on. Furthermore, the weight may be normalized according to various parameters.

Following step 203 (FIG. 2), the weighted graph 756 is filtered such that only edges that were assigned with a weight which satisfies a rule, e.g. weights above a predetermined edge weight threshold, are kept as part of the weighted graph. An example of such a filtered graph is illustrated by clique graph 758. A specific example of a clique may be: [{hot, burning}⇔firmware⇔{LG, Samsung, phone, Android}]. This clique example comprises word sets A, B, and C mentioned hereinabove, since these word sets are all connected to one another by edges in the graph; word set A is connected by edges to word set B and word set C, and word set B is also connected to word set A and C. It is notes that the weighted graph is an undirected graph, since edges connecting between word sets are undirected.

Following step 204.1 (FIG. 2), a query is generated per each clique. For example, query 760, which is based on word sets A, B, and C, is as follows: '(hot OR burning) AND firmware AND (LG OR Samsunmg OR phone OR Android)'. An 'OR' operation may be used between words of a single word set, while the operation 'AND' may be used between different word sets. Finally, following step 204.5 a snippet 762 may be displayed to a user, for example, via a user interface, e.g., user interface 151 (FIG. 1B). In example 750, the snippet 762 may include: " . . . after the firmware update my phone seemed to have issues and was heating up in my pocket . . . " As apparent from snippet 762, the word 'firmware' which is the word constructing word set B is mentioned by snippet 762, the word 'phone', which is part of word set C, is also mentioned by snippet 762, and the word 'heating', which is semantically similar to the word 'hot' of word set A, also appears in snippet 762. That is, snippet 762 comprises at least one word from every word set that the query is based on, or at least one word that is semantically similar to any word from each word set that the query is based on. In some cases, the snippet may comprise more than one word per each word set that the query is based on.

Reference is now made to FIG. 8, which is a schematic flow chart of performed method for preparing an investigation report regarding a change in one or more monitored parameters related to obtained interactions of a customer service center, according to embodiments of the invention. Method 800 comprises several operations in order to generate a report that may display a list of snippets. In some embodiments, all snippets in the list may represent one root cause, whereas in other embodiments, each snippet in the list may represent a different root-cause.

Step 802 may comprise continuously monitoring customer service center parameters related to obtained interactions. Various parameters relating to interactions obtained and recorded during a certain time period may be continuously monitored, e.g., by analysis unit 154 (FIG. 1B). Such parameters may be for example, the number of interactions received during a certain period along the day, which may be compared to the number of interactions received during that same period on a previous day or previous days, or any other time period. Another example for a parameter related to the recorded interactions that may be monitored is the number of interactions identified as dissatisfaction-type interactions, which were received during a specific period or time of day. These dissatisfaction type interactions may be compared to the number of such interactions that were recorded during that same period on a previous day or days or any other time period.

In some embodiments, step 804 may comprise detecting a triggering event. e.g., a significant change in one or more monitored parameters. For example, an increase in the number of obtained interactions, and/or in the number of obtained interactions identified as dissatisfaction-type interactions may be detected, e.g., by an analysis unit. The increase in the number of any type of interactions may be compared to a predetermined threshold, such to determine whether it is a significant increase which may indicate a certain problem that has an underlying root-cause, or whether it is an increase that is within the normal distribution. After detecting a triggering event in step 804, in step 806 analysis of interactions with a customer service center is performed, to identify at least one representative interaction. In some embodiments, the analysis of interactions may be performed according to the method in FIG. 2 and/or FIG. 7A and/or FIG. 7B, such to identify at least one representative interaction, which may correspond to a root-cause.

Then, step 808 may comprise displaying at least a portion of the representative interaction via a user interface. The portion of the representative interaction may be a snippet. The portion of the interaction, e.g., the snippet, may be displayed to the user via a user interface, e.g., user interface 151 (FIG. 11B). In some embodiments, the snippet may be displayed to a group of predetermined users, e.g. to users who are trained as system analysts and may determine an underlying root-cause of reported issues based on the displayed snippet. The displayed snippet may significantly reduce the time to resolution of an identified root-cause.

Reference is now made to FIGS. 9A-9B, which schematically illustrate a first part and a second part, respectively, of an investigation report regarding monitored parameters related to obtained interactions of a customer service center, according to embodiments of the invention. Part one of the investigation report as illustrated in FIG. 9A, may relate to a first root-cause, while part two of the investigation report as illustrated in FIG. 9B may relate to a second different root-cause. As illustrated in FIGS. 9A-9B, the investigation report may include display of the total increase in the number of obtained and/or recorded interactions, e.g., calls received by the customer service center. The investigation report may further include the time period during which the interactions were obtained, e.g., the last seven days. In addition, the report may include an identification of the type of the interactions or calls, e.g., DSAT, which may stand for Dissatisfaction-type interactions.

According to FIG. 9A, part one of the investigation report may comprise display of the increase in the number of interactions that relate to the first root-cause displayed in the report. The time period during which the interaction relating to that root-cause is also displayed, as is the type of root-cause, e.g., which fields the root-cause corresponds with. For example, the first root-cause is relevant to dissatisfaction type interactions, relevant to product X, and relevant to Technical type calls or interactions.

The display of the investigation report may include one or more portions of interactions, e.g., snippets of interactions that represent the first root-cause, and provide context in order to enable full understanding of the root-cause. For example, FIG. 9A includes four examples of snippets that are all related to substantially the same root-cause. The first snippet recites: " . . . after the firmware update my phone seemed to have issues and was beating up in my pocket . . . " The second snippet recites: "OS update on Sunday has caused my phone to slow down and considerably heat up . . . " If we refer to the example in FIG. 7B, then it is clear that the first snippet includes more words of the query ((hot OR burning) AND firmware AND (LG OR Samsung OR phone OR Android)), as compared to the second snippet. For this reason, the first snippet may receive a higher relevance score and accordingly may be displayed first, though other orders of display may be possible. The third snippet recites: "Sunday two days ago my phone started to get really warm, I think it is from the battery . . . ", and the fourth snippet recites: "battery in my phone is burning hot, might be because I installed latest android update . . . ". It is evident that all four snippets examples recite words concerning heat and phone, thus this list of snippets provides context with regards to the root-cause.

In some embodiments, the investigation report may comprise a graphical display of the volume or extent of the root-cause, which corresponds to the listed snippets. The graphical display may comprise a graph of a cake sliced according to percentage of volume per each snippet. The volume associated with each snippet may be based on the number of obtained interactions that are similar to the representing snippet. In other embodiments, the pie chart may include a slice per each different root-cause, such that the relative size of each slice represents the volume of each root-cause. The size of each slice indicates the extent of interactions that each root-cause was associated with, compared to the total number of obtained interactions.

Part two of the investigation report, as illustrated by FIG. 9B, may comprise a description of a second root-cause. As illustrated in FIG. 9A, the second part of the report may comprise display of the increase in the number of interactions that relate to the first root-cause displayed in the report. The time period during which the interaction relating to that root-cause is also displayed, as is the type of root-cause, e.g., which fields the root-cause corresponds with. For example, the first root-cause is relevant to dissatisfaction type interactions, relevant to customer support, to billing, and relevant to late fee. As an example, with respect to the second part of the report, the second root-cause is given context via three snippets. For example, the first snippet representing the second root-cause recites: "email with invoice went to my spam folder so I was unaware of the bill . . . ", the second snippet recites: "for some reason the email you sent about my bill never got to my inbox. I only noticed today it was sent to my spam mail . . . ", and the third snippet recites: "I never received these past months billing information, please resend it and remove the late fee I understand is attached . . . " From these snippets, it is evident that the root cause is related to bills that reached spam instead of the inbox of the email address of the users. That is, the snippets provide a good understanding of what the root-cause is. As described hereinabove with respect to FIG. 7A, the order of displaying the snippets may be random or according to predetermined parameters. As in FIG. 9A, part two of the report may also comprise a graphical display of the extent and volume of interactions corresponding to an underlying root cause that may be associated with each snippet, compared to the total interactions relevant to the same (e.g., second) root-cause. In other embodiments, the graphical display may illustrate the volume and extent of all root-causes with respect to the total obtained interactions.

It is clear from the present invention that instead of displaying a word cloud to the analysts of the customer service center and letting them to listen to calls or process interactions received from users, in order to solve the puzzle of what root-causes affect the users, the present invention provides a clear and easy to understand automated analysis and display with natural language text that may simply explain the root cause of an issue or topic, which is identified by the analysis unit of the present invention. The present invention further provides the possibility to expand the user base for investigation by eliminating the need for manual investigation, as well as enabling easy comparing of the volume of root causes of an identified topic.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise consociating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a program or a part thereof operating or interacting with one or more other parts of the system.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computer-implemented method for analysis of interactions with a customer service center, said method comprising:
    receiving a plurality of customer service interactions, the customer service interactions including data obtained from a communication of a customer with the customer service center;
    receiving a word cloud computed for the plurality of customer service interactions, the word cloud comprising a plurality of words selected from the customer service interactions;
    consolidating similar or synonymous words into word sets;
    for a pair of the word sets, calculating a proximity score, said proximity score corresponding to a degree of affinity between the word sets of the pair;
    constructing a weighted graph of the word sets based on the calculated proximity scores;
    identifying a subset of word sets in the graph, the subset of word sets corresponding to an interaction topic;
    generating a query for the interaction topic based on the corresponding subset of word sets;
    retrieving, from an interactions storage unit, customer service interactions that match the generated query;
    selecting at least one representative interaction from the retrieved customer service interactions, based on one or more predetermined parameters; and
    displaying at least a portion of the representative interaction for the selected identified topic,
    wherein the method is performed using a processor.

2. The method according to claim 1, further comprising:
    selecting a representative snippet from the representative interaction; and
    displaying the representative snippet for the selected identified topic, said
    snippet representing a root cause identified for at least a portion of the plurality of customer service interactions.

3. The method according to claim 1, wherein communication of a customer with the customer service center is selected from a group comprising: audio interaction, email, messaging, chat, web form, social media, or survey.

4. The method according to claim 1, further comprising selecting a reduced set of edges from the graph based on a comparison of weight of edges in the graph with a weight threshold.

5. The method according to claim 4, further comprising removing edges from the graph if the edge weight is below the weight threshold.

6. The method according to claim 1, wherein identifying a subset of word sets in the graph comprises identifying a clique in the graph.

7. The method according to claim 6, further comprising identifying a plurality of cliques in the graph, and filtering cliques that satisfy a predetermined condition.

8. The method of claim 6, further comprising calculating size and weight values of each clique.

9. The method according to claim 8, further comprising comparing calculated size and weight values of each clique to corresponding thresholds or to a predetermined range.

10. The method according to claim 9, further comprising filtering cliques that their calculated size and weight values are above or below the corresponding size and weight values thresholds or within the predetermined range.

11. The method according to claim 1, wherein generating a query comprises including at least one word from each word set per the subset of word sets.

12. The method according to claim 1, further comprising calculating a score for retrieved interactions based on one or more predetermined parameters, and selecting a representative interaction based on the calculated score.

13. The method according to claim 2, wherein selecting the representative snippet from the representative interaction comprises finding a snippet that comprises at least one word of each word set of the query, wherein the words of the query are located between a word assigned as the first word in the representative interaction, which is any word of the query that appears first in the representative interaction, and a word assigned as the last word in the representative interaction, which is any word of the query that appears last in the representative interaction.

14. The method according to claim 1, wherein selecting one or more identified topics comprises calculating size and weight values of each identified topic, and filtering identified topics that are above or below corresponding size and weight values thresholds or within a predetermined range.

15. The method according to claim 2, wherein displaying comprises providing a user interface configured to display a list of snippets representing one or different root causes, wherein the list of snippets is displayed in an order according to a determined volume of each root cause.

16. The method according to claim 15, wherein the order of display of the list of snippets is at a descending or an ascending order of the volume of each root cause, each root cause represented by a corresponding snippet.

17. The method according to claim 15, wherein the volume of each root cause is determined by the number of interactions retrieved by its corresponding query.

18. A computer-implemented system for analysis of interactions with a customer service center, said system comprising:
   a customer service center system comprising a user interface configured to accept and record customer service interactions with users, the customer service interactions including data obtained from a communication of a customer with the customer service center;
   a storage unit configured to store a word cloud generated by a processor, based on words or phrases selected from the interactions;
   a customer service interaction analysis unit configured to:
      receive the word cloud from the word cloud storage unit,
      consolidate similar or synonymous words into word sets,
      for a pair of the word sets, calculate a proximity score, said proximity score corresponding to a degree of affinity between the word sets of the pair;
      construct a weighted graph of the word sets based on the calculated proximity scores,
      identify one or more subset of word sets in the graph, each subset of word sets corresponding to an interaction topic,
      generate a query for an interaction topic based on the corresponding subset of word sets,
      retrieve customer service interactions that match the generated query,
      select a representative interaction from the retrieved customer service interactions, based on one or more predetermined parameters, and
      display, via the user interface, at least a portion of the representative interaction for the selected identified topic.

19. The system according to claim 18, wherein the customer service interaction analysis unit is further configured to: select a representative snippet from the representative interaction; and
   Display, via the user interface, the representative snippet for the selected identified topic, said snippet representing a root cause identified for at least a portion of the plurality of customer service interactions.

20. The system according to claim 18, wherein communication of a customer with the customer service center is selected from a group comprising: audio interaction, email, messaging, chat, web form, social media, or survey.

21. The system according to claim 18, wherein the customer service interaction analysis unit is further configured to select a reduced set of edges from the graph based on a comparison of weight of edges in the graph with a weight threshold, thereby removing edges from the graph if the edge weight is below the weight threshold.

22. The system according to claim 18, wherein the customer service interaction analysis unit is further configured to select the representative snippet from the representative interaction by finding a snippet that comprises at least one word of each word set of the query, wherein the words of the query are located between a word assigned as the first word in the representative interaction, which is any word of the query that appears first in the representative interaction, and a word assigned as the last word in the representative interaction, which is any word of the query that appears last in the representative interaction.

23. The system according to claim 18, wherein the user interface is configured to display a list of snippets representing one or different root causes, wherein the list of snippets is displayed in an order according to a determined volume of each root cause.

24. The system according to claim 23, wherein the order of display of the list of snippets is at a descending or an ascending order of the volume of each root cause, each root cause represented by a corresponding snippet.

25. The system according to claim 23, wherein the volume of each root cause is determined by the number of interactions retrieved by its corresponding query.

* * * * *